US012509801B2

(12) United States Patent
Sixta et al.

(10) Patent No.: US 12,509,801 B2
(45) Date of Patent: Dec. 30, 2025

(54) RECYCLING OF ACID-SUPERBASE CONJUGATE IONIC LIQUIDS BY WATER REMOVAL IN THE LYOCELL SPINNING PROCESS

(71) Applicant: Aalto University Foundation sr, Aalto (FI)

(72) Inventors: Herbert Sixta, Aalto (FI); Sherif Elsayed, Aalto (FI); Inge Schlapp-Hackl, Aalto (FI); Joanna Witos, Aalto (FI); Sanna Hellsten, Aalto (FI); Petri Uusi-Kyyny, Aalto (FI); Michael Hummel, Aalto (FI); Ville Alopaeus, Aalto (FI)

(73) Assignee: Aalto University Foundation sr, Aalto (FI)

( * ) Notice: Subject to any disclaimer, the term of this patent is extended or adjusted under 35 U.S.C. 154(b) by 516 days.

(21) Appl. No.: 17/926,645

(22) PCT Filed: May 19, 2021

(86) PCT No.: PCT/FI2021/050362
§ 371 (c)(1),
(2) Date: Nov. 21, 2022

(87) PCT Pub. No.: WO2021/234226
PCT Pub. Date: Nov. 25, 2021

(65) Prior Publication Data
US 2023/0203717 A1    Jun. 29, 2023

(30) Foreign Application Priority Data

May 19, 2020 (FI) .................................. 20205500

(51) Int. Cl.
*D01F 2/02* (2006.01)
*D01F 13/00* (2006.01)
(52) U.S. Cl.
CPC ............... *D01F 2/02* (2013.01); *D01F 13/00* (2013.01)
(58) Field of Classification Search
CPC ................................. D01F 2/02; D01F 13/00
USPC ........................................................ 8/115.51
See application file for complete search history.

(56) References Cited

FOREIGN PATENT DOCUMENTS

| WO | WO-2018138416 A1 * | 8/2018 | ........... B29C 48/022 |
|---|---|---|---|
| WO | WO2019092319 A1 | 5/2019 | |

OTHER PUBLICATIONS

Baird et al: Vapor-Liquid Equilibrium of Ionic Liquid 7-Methyl-1,5,7-triazabicyclo[4.4.0.]dec-5-enium Acetate and its Mixtures with Water. J. Chem. Eng. Data 2020, vol. 65, pp. 2405-2421.
Elsayed et al: Limitations of cellulose dissolution and fiber spinning in the lyocell process using [mTBDH][AOc] and [DBNH][AOc] solvents. Ind. Eng. Chem. Res. 2020, vol. 59, pp. 20211-20220.
Elsayed et al: Recycling of superbase-based ionic liquid solvents Solvents for the Production of Textile-Grade Regenerated Cellulose Fibers in the Lyocel I Process Acs sustainable chemistry & engineering, 2020, vol. 8, pp. 14217-14227.
Parviainen et al: Predicting cellulose solvating capabilities of acid-base conjugate ionic liquids. Chemsuschem, vol. 6, 2013, pp. 2161-2169.
Amarasekara. "Acidic Ionic Liquids." Chem. Rev., vol. 116, 2016, pp. 6133-6183.
Angell et al. "Parallel Developments in Aprotic and Protic Ionic Liquids: Physical Chemistry and Applications." Accounts of Chemical Research, vol. 40, No. 11, 2007, pp. 1228-1236.
Benjamin. "Effect of some Ioncell-F process parameters on the cellulose dissolution and dope spinnability." Bioproducts and Biosystems, Aalto University: Espoo, 2019.
Bentivoglio et al. "Cellulose processing with chloride-based ionic liquids." Lenzinger Berichte, vol. 86, 2006, pp. 154-161.
Cai et al. "Structure and properties of cellulose fibers from ionic liquids." J. Appl. Polym. Sci., vol. 115, No. 2, 2010, pp. 1047-1053.
Carafa et al. "DBU-Promoted Nucleophilic Activation of Carbonic Acid Diesters." European Journal of Organic Chemistry, vol. 13, 2011, pp. 2458-2465.
Earle et al. "The distillation and volatility of ionic liquids." Nature, vol. 439, No. 7078, Feb. 16, 2006, pp. 831-834.
Ebner et al. "Side reaction of cellulose with common 1-alkyl-3-methylimidazolium-based ionic liquids." Tetrahedron Lett., vol. 49, 2008, pp. 7322-7324.

(Continued)

*Primary Examiner* — Amina S Khan
(74) *Attorney, Agent, or Firm* — Laine IP Oy

(57) ABSTRACT

According to an example aspect of the present invention, there is provided a process for the production of a cellulose filaments or films, comprising the steps of dissolving a cellulose substrate in an ionic liquid consisting of the superbase cation 7-methyl-1,5,7-triazabicyclo[4.4.0]dec-5-enium [mTBDH]+ and an anion to produce a solution forming a spinning dope, said anion being derived from an acid which is present at a stoichiometric excess to the superbase, extruding the spinning dope through a spinneret in a coagulation bath containing water to form filaments or films from the solution, withdrawing ionic liquid in an aqueous mixture with water from the coagulation bath, recovering the ionic liquid [mTBDH][OAc] from the aqueous mixture by removing water and optionally recycling the recovered ionic liquid to the dissolution step.

16 Claims, 7 Drawing Sheets

(56) References Cited

OTHER PUBLICATIONS

Elsayed et al. "Comparative evaluation of the dry-jet wet spinning behaviour of three superbase-based ionic liquids in comparison to NMMO." Unpublished, 2020.
Guizani et al. "Air gap spinning of a cellulose solution in an ionic liquid with a novel vertically arranged spinning bath to simulate a closed loop operation." Cellulose submitted, 2020.
Hauru et al. "Cellulose regeneration and spinnability from ionic liquids." Soft Matter, vol. 12, 2016, pp. 1487-1495.
Hauru et al. "Role of Solvent Parameters in the Regeneration of Cellulose from Ionic Liquid Solutions." Biomacromolecules, vol. 13. No. 9, 2012, pp. 2896-2905.
Heidelberger et al. "Amidine als Zwischenprodukte bei Umamidierungsreaktionen." 9. Mitteilung über Umamidierungsreaktionen, vol. 64, No. 2, 1981, pp. 399-406.
Hummel et al. "Ionic liquids for the production of man-made cellulosic fibers: opportunities and challenges." Adv. Polym. Sci., vol. 271, 2016, pp. 133-168.
Hyde et al. "Investigating the Underappreciated Hydrolytic Instability of 1,8-Diazabicyclo[5.4.0]undec-7-ene and Related Unsaturated Nitrogenous Bases." Org. Process Res. Dev., vol. 23, No. 9, 2019, pp. 1860-1871.
King et al. "Relative and inherent reactivities of imidazolium-based ionic liquids: the implications for lignocellulose processing applications." RSC Adv., vol. 2, 2012, pp. 8020-8026.
Krässig et al. "Cellulose." Ullmann's Encyclopedia of Industrial Chemistry, 2004.
Laus et al. "Ionic liquids: current developments, potential and drawbacks for industrial applications." Lenzinger Berichte, vol. 84, 2005, pp. 71-85.
Lewis et al. The Nonenzymatic Decomposition of Guanidines and Amidines. Journal of the Americal Chemical Society, vol. 136, No. 1, 2014, pp. 130-136.
Mayr et al. "Scales of Lewis Basicities toward C-Centered Lewis Acids (Carbocations)." Journal of the Americal Chemical Society, vol. 137, No. 7, 2015, pp. 2580-2599.
Michud. "Development of a novel process for the production of man-made cellulosic fibers from ionic liquid solution." Department of Forest Products Technology, Dissertation, Aalto University: Espoo, 2016, p. 71.
Michud et al. "Influence of molar mass distribution on the final properties of fibers regenerated from cellulose dissolved in ionic liquid by dry-jet wet spinning." Polymer, vol. 75, 2015, pp. 1-9.
Oediger et al. "1.5-Diaza-bicyclo[4.3.0]nonen-(5). Ein neues Reagenz zur Einführung von Doppelbindungen." Chemische Berichte, vol. 99, No. 6, 1966, pp. 2012-2016.
Ostonen. "Thermodynamic study of protic ionic liquids." Department of Biotechnology and Chemical Technology, Aalto University: Espoo, 2017.
Ribeiro et al. "Experimental Evidence for Azeotrope Formation from Protic Ionic Liquids." ChemPhysChem, 2018, Ahead of Print.
Swatloski et al. "Dissolution of cellulose with ionic liquids." Journal of the American Chemical Society, vol. 124, No. 18, 2002, pp. 4974-4975.
Wolfe. "Kinetics and mechanisms of reactions of amidines." Amidines and Imidates, John Wiley & Sons, 1975, pp. 349-384.
Zhou et al. "Recovery and purification of ionic liquids from solutions: a review." RSC Advances, vol. 8, No. 57, 2018, pp. 32832-32864.

* cited by examiner

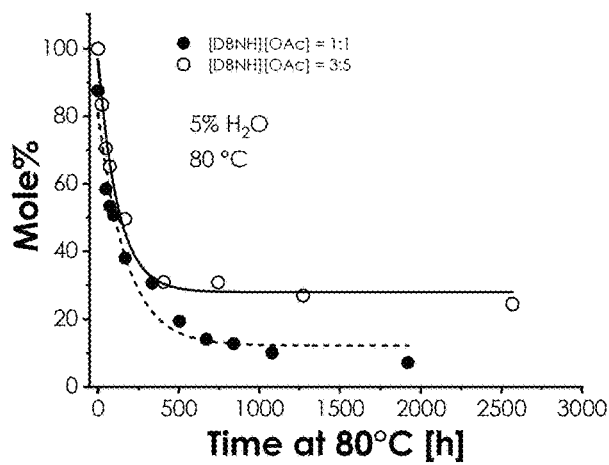
Fig. 4
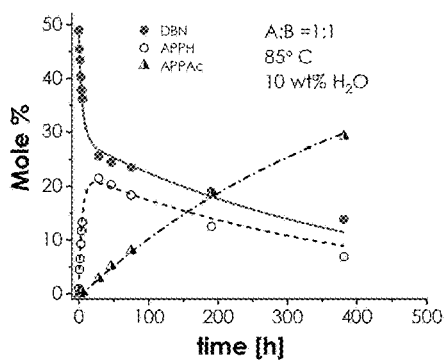 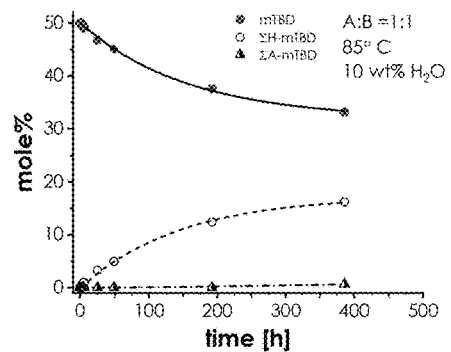
Fig. 5A    Fig 5B
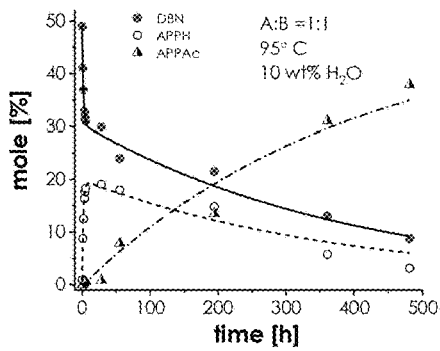 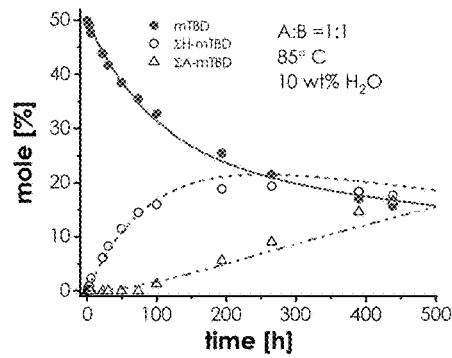
Fig. 6A    Fig 6B

RECYCLING OF ACID-SUPERBASE CONJUGATE IONIC LIQUIDS BY WATER REMOVAL IN THE LYOCELL SPINNING PROCESS

FIELD

The present invention relates to a process for the production of using ionic liquids, particularly acid-superbase conjugate ionic liquids as cellulose solvents in the Lyocell process. In particular the invention relates to the recovery and recycling of the acid-superbase conjugate ionic liquids.

BACKGROUND

Ionic liquids (ILs), molten salts with melting points below 100° C., have gained importance as high-performance cellulose solvents since the groundbreaking findings of Rogers and his co-workers in 2002 [2]. Alkylated imidazolium chlorides, acetates or diethylphosphates (DEP) are the most frequently studied powerful cellulose solvents. It was shown that, compared to the NMMO process, the direct dissolution of cellulose is more easily controlled, the process inherently safer, and fibers with properties equal to those produced from NMMO solution were obtained[3, 4]. However, the imidazolium-based ionic liquids have shown to be not inert towards cellulose [3, 5]. Depending on the substituents on the cation and the chemical nature of the anion, cellulose was strongly degraded, also because a higher temperature was required to achieve good spinnability, which in turn required the use of stabilizers. The ILs of the first generation typically had chlorides as anions with the disadvantage that they required high spinning temperature due to the high viscosity of the resulting cellulose solution and also exhibited a high corrosion potential towards the materials used in the spinning equipment [6]. Chloride was quickly replaced by acetate, which greatly improved solubility to cellulose and also significantly reduced the risk of corrosion, as illustrated by the example of [emim][OAc]. Nonetheless, the resulting cellulose solution produced revealed insufficient spinning behaviour due to the delayed regeneration kinetics [7]. As an alternative to imidazolium based ionic liquids, superbase-based acetates have proven to be excellent cellulose solvents with comparable or even improved spinning behaviour as compared to solutions of cellulose in NMMO monohydrate. Among this category of acid-base conjugate ILs, 1,5-diazabicyclo[4.3.0]non-5-ene (DBN), 1,8-diazabicylco[5.4.0]undec-7-ene (DBU) and 7-methyl-1,5,7-triazabicyclo[4.4.0]dec-5-ene (mTBD) revealed both excellent cellulose dissolution property and dry-jet/wet spinning performance[1, 8, 9].

Subsequently, the air gap spinning process based on the solvents [DBNH][OAc] and [mTBDH][OAc] was further developed and registered as Ioncell® fiber process. The cellulose solvent [DBUH][OAc] also belongs to this Ioncell® category, but is currently no longer investigated as a solvent since there are no convincing advantages over the other two ILs[9].

During the development of the Ioncell® process, it was shown that the guanidinium-based IL, [mTBDH][OAc], is more suitable for the fiber process than the originally proposed amidinium-based IL, [DBNH][OAc], primarily because of its higher hydrolytic stability in the presence of water[1]. This hydrolytic stability is essential for loss-free water removal in the recovery process.

Both ionic liquids belong to the Brönsted acidic ionic liquids (BAIL), in which the proton is transferred to the cation [10]. The extent of proton transfer may be estimated by the $\Delta pKa$ which can be calculated as the difference of the pKa's of the acid from the base. It is reported that a protic IL that has a $\Delta pKa$ value higher than 8-10 has "ideal" ionicity[11]. With a reported pKa of mTBD in water of 13.0/15.0 (experiment/calculated) and of acetic acid of 4.75, a $\Delta pKa$ of 8.25/10.25 for the BAIL [mTBDH][OAc] can be calculated which reveals a high ionicity[12]. Assuming that the pKa of DBN (the pKa in water has not been published) is comparable to that of DBU, a $\Delta pKa$ of 6.75/8.75 [11.5 (exp)-4.75]/[13.5 (calcd)-4.75] can be estimated[12]. This simplified approximation shows that the ionicity of [mTBDH][OAc] can be assumed to be significantly higher than that of [DBNH][OAc]. Conjugated carboxylic acids of organic superbases can be distilled at relatively low temperatures and low pressures, whereby the neutral species are formed in the gas phase via a dynamic equilibrium according to:

$$[mTBDH]^+[OAc]^- \leftrightarrows mTBD_l + HOA_{cl} \leftrightarrows mTBD_g + HOAc_g \qquad [13].$$

It was also shown that the basicity of the anion ($\beta$-value, an empirical Kamlet-Taft (KT) parameter[14]) determines the volatility of the ionic liquid. For imidazolium-based ionic liquids it was found that the better the ability to dissolve cellulose, the more thermally unstable it is[15]. Although comparable in the general trend, this was not the case for DBN- and mTBD-based ionic liquids. Although the KT parameters showed that [mTBD][OAc] indicates a slightly better ability to dissolve cellulose, [mTBDH][OAc] has a clearly higher thermal stability than [DBNH][OAc] (FIG. 1).

The KT parameters of both ionic liquids are summarized in Table 1.

TABLE 1

Kamlet-Taft parameters of water-free [mTBDH][OAc] and [DBNH][OAc]

| Parameter | [mTBDH][OAc] | [DBNH][OAc] |
|---|---|---|
| ET (30) | 48.96 | 49.88 |
| $\pi^*$ | 1.01 | 0.99 |
| $\alpha$ | 0.42 | 0.49 |
| $\beta$ | 1.17 | 1.08 |
| $\beta-\alpha$ | 0.75 | 0.49 |

The higher values of $\beta$ and $\beta-\alpha$ in the case of [mTBDH][OAc] indicate a slightly better cellulose dissolving power than [DBNH][OAc].

SUMMARY OF THE INVENTION

The invention is defined by the features of the independent claim. Some specific embodiments are defined in the dependent claims.

According to an aspect of the present invention, there is provided a process for the production of cellulose filaments or films. According to the process a cellulose substrate is dissolved in an ionic liquid consisting of the superbase cation 7-methyl-1,5,7-triazabicyclo[4.4.0]dec-5-enium [mTBDH]⁺ and an anion to produce a solution forming a spinning dope, said anion being derived from an acid which is present at a stoichiometric excess to the superbase. The spinning dope through a spinneret in a coagulation bath containing water to form filaments or films from the solution. The ionic liquid is withdrawn from the coagulation bath in an aqueous mixture with water. The ionic liquid [mTBDH][OAc] is recovered from the aqueous mixture by removing water and the recovered ionic liquid is optionally recycled to the dissolution step.

BRIEF DESCRIPTION OF THE DRAWINGS

FIG. 4 shows the kinetics of DBN degradation in an ionic liquid with acid-base ratios of 1:1 compared to 5:3 (azeotropic mixture).

FIG. 5 shows (left) the kinetics of DBN hydrolysis and (right) the kinetics of mTBD hydrolysis at 85° C. in an acetic acid-base ratio of 1:1 and in presence of 10 wt % water FIG. 6 shows (left) the kinetics of DBN hydrolysis and (right) the kinetics of mTBD hydrolysis at 95° C. in an acetic acid-base ratio of 1:1 and in presence of 10 wt % water

FIG. 11 shows the proportional area of undissolved fiber elements in a 13 wt % Cellulose solution in [mTBDH](1-x)[TBDH]x[OAc].

EMBODIMENTS

Definitions

Unless otherwise stated herein or is clear from the context, any percentages referred to herein are expressed as percent by weight based on a total weight of the respective composition.

Unless otherwise stated, properties that have been experimentally measured or determined herein have been measured or determined at room temperature. Unless otherwise indicated, room temperature is 25° C.

Unless otherwise stated, properties that have been experimentally measured or determined herein have been measured or determined at atmospheric pressure.

It must also be noted that, as used in the specification and the appended claims, the singular forms "a," "an" and "the" include plural referents unless otherwise specified.

As used herein, the term "about" refers to the actual given value, and also to an approximation to such given value that would reasonably be inferred by one of ordinary skill in the art, including approximations due to the experimental and/or measurement conditions for such given value.

As used herein, unless otherwise indicated, the term "average molecular weight" refers to a weight average molecular weight (also abbreviated "Mw" or "Mw").

The present invention addresses the production of man-made cellulose fibres (MMCF) by the Lyocell process using ionic liquids as cellulose solvents. More specifically, the ionic liquid used belongs to the group of acid-superbase conjugates which has already been described in an earlier invention as an extraordinarily powerful cellulose solvent with which it is possible to produce spinnable cellulose solutions which can be spun into MMCFs with very high strengths by a dry-wet spinning process[1]. The present invention shows that this solvent can be fully recovered under certain conditions by maintaining the level of degradation reactions of the used superbase at an acceptable level without affecting the solubility of cellulose or the spinning behaviour of the resulting cellulose solution. It has surprisingly been found that the unexpected composition in which [mTBDH][OAc] makes it possible, on the one hand, to limit the extent of hydrolysis to a low level and, on the other hand, to maintain the solubility properties for cellulose up to high concentrations while keeping the rheological properties at a level that allows excellent spinning properties. Neither [DBNH][OAc] nor [DBUH][OAc] allow an analogous use in connection with their recycling by water removal.

Figure 1:
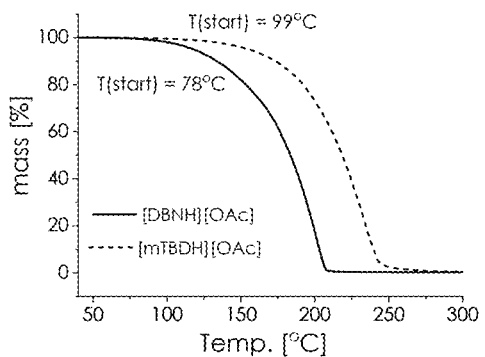
FIG. 1 shows the results of a thermogravimetric analysis (TGA) of the ionic liquids [DBNH][OAc] and [mTBDH][OAc]. It clearly confirms the higher volatility of [DBNH][OAc] as compare to [mTBDH][OAc].

FIG. 1 is a graph showing the results of a thermogravimetric analysis (TGA) of ionic liquids [DBNH][OAc] and [mTBDH][OAc] Although the KT parameters shown in Table 1 showed that [mTBD][OAc] indicates a slightly better ability to dissolve cellulose, [mTBD][OAc] has a clearly higher thermal stability [DBN][OAc].

Figure 2:
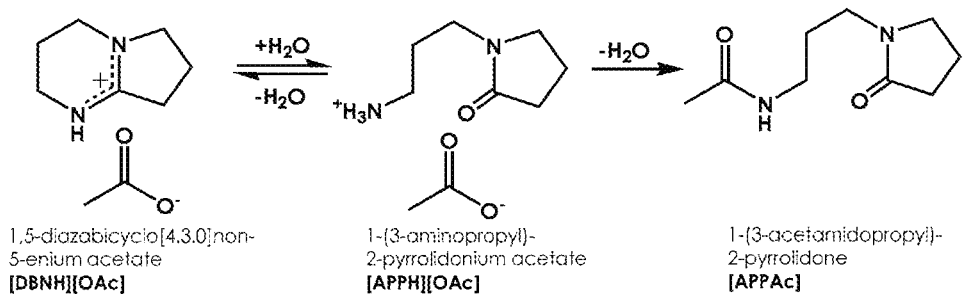
FIG. 2 shows the hydrolysis reactions of [DBNH][OAc] in the presence of water followed by the irreversible formation of acetamide

FIG. 2 shows the hydrolysis reactions of [DBNH][OAc] in the presence of water followed by the irreversible formation of acetamide. Hydrolysis is an equilibrium reaction and can therefore be shifted back to the superbase by suitable reaction conditions, such as acid catalysis. However, in the presence of the acetate anion in an ionic liquid, the hydrolysis products are converted to the corresponding acetamides. These consecutive reactions are irreversible, so that there is no possibility of restoring the original superbase.

Figure 3:
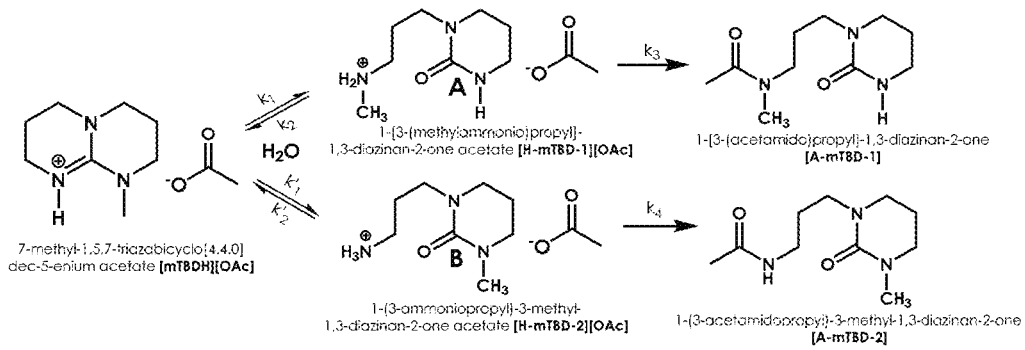
FIG. 3 shows the hydrolysis reactions of [mTBDH][OAc] in the presence of water followed by the irreversible formation of acetamide

FIG. 3 shows the hydrolysis reactions of [mTBDH][OAc] in the presence of water followed by the irreversible formation of acetamide. Hydrolysis is an equilibrium reaction and can therefore be shifted back to the superbase by suitable reaction conditions, such as acid catalysis. However, in the presence of the acetate anion in an ionic liquid, the hydrolysis products are converted to the corresponding acetamides. These consecutive reactions are irreversible, so that there is no possibility of restoring the original superbase.

FIG. 4 shows the kinetics of DBN degradation in an ionic liquid with acid-base ratios of 1:1 compared to an ionic liquid in which the acetic acid was superstoichiometrically increased up to 5:3 (azeotropic mixture). The azeotrope is richer in acetic acid due to its higher ability to generate H-bonds with the ion pair. Despite such a high acid to base ratio of 5:3, DBN degradation is hardly slowed down compared to the equimolar acid to base composition, especially in the first hours. In the composition of the azeotrope (A:B=5:3), a slightly higher equilibrium concentration of DBN is achieved. However, this behaviour is irrelevant for the Ioncell® process. Since acetic acid is a non-solvent, the ionic liquid is no longer a cellulose solvent at an acid-base ratio of 5:3.

FIG. 5 shows (left) the kinetics of DBN hydrolysis and (right) the kinetics of mTBD hydrolysis at 85° C. in an acetic acid-base ratio of 1:1 and in presence of 10 wt % water. FIG. 5 shows the significant difference in the hydrolytic stability of the two ILs, especially during the first hundred hours.

FIG. 6 shows (left) the kinetics of DBN hydrolysis and (right) the kinetics of mTBD hydrolysis at 95° C. in an acetic acid-base ratio of 1:1 and in presence of 10 wt % water. FIG. 6 shows the significant difference in the hydrolytic stability of the two ILs, especially during the first hundred hours.

Figure 7:
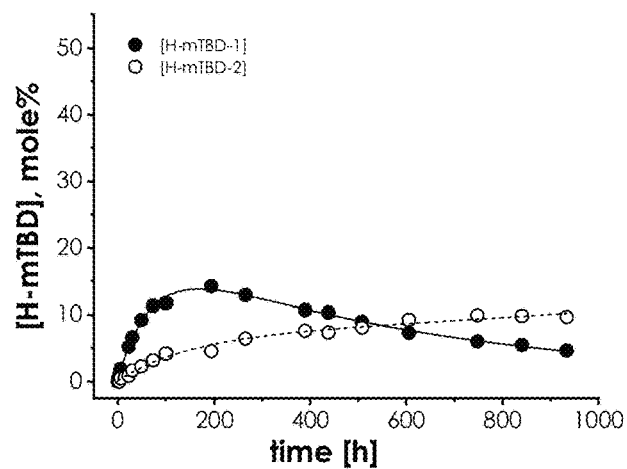
FIG. 7 shows the kinetics of formation and consumption of the two isomeric H-mTBD forms at 95° C. and 10 wt % water

FIG. 7 shows the kinetics of formation and consumption of the two isomeric H-mTBD forms at 95° C. and 10 wt % water. As can be seen in FIG. 7, the formation of H-mTBD-1 is preferred.

Figure 8:
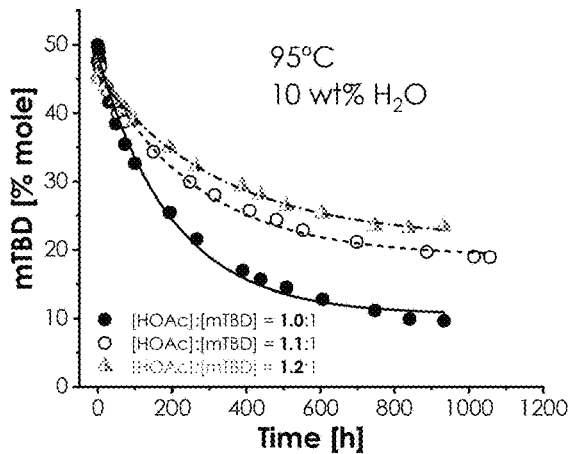
FIG. 8 shows the disappearance of [mTBD] in the ionic liquid, [mTBDH][OAc], over time with different acid-to-base molar ratios at 95° C. and in the presence of 10 wt % water FIG. 9 show the percentage degradation of mTBD in a PIL, [mTBD][OAc], as a function of time at 95° C. and various acid-base ratios 1:1 (reference); 1.1:1 and 1.2:1

FIG. 8 shows the disappearance of [mTBD] in the ionic liquid, [mTBDH][OAc], over time with different acid-to-base molar ratios at 95° C. and in the presence of 10 wt % water. In contrast to [DBNH][OAc], even a slight stoichiometric excess of acetic acid causes a significant stabilization of the cation in the ionic liquid [mTBDH] [OAc].

Figure 9:
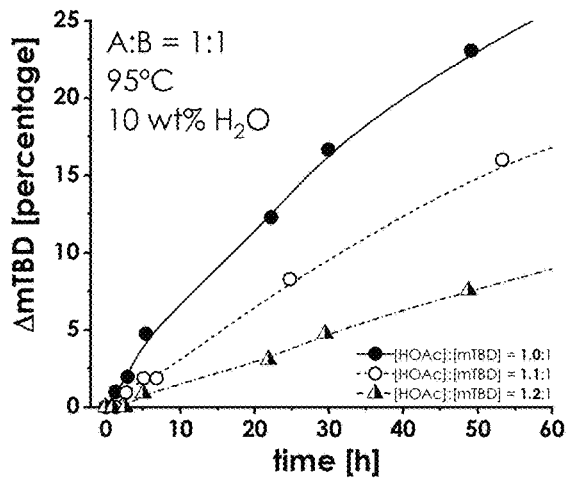

FIG. 9 show the percentage degradation of mTBD in a Protic ionic liquid (PIL), [mTBD][OAc], as a function of time at 95° C. and various acid-base ratios 1:1 (reference); 1.1:1 and 1.2:1. The stabilizing effect of an excess of acetic acid is very pronounced in the first few hours. This is particularly relevant for the recovery of ionic liquid by thermal evaporation of water.

Figure 10:
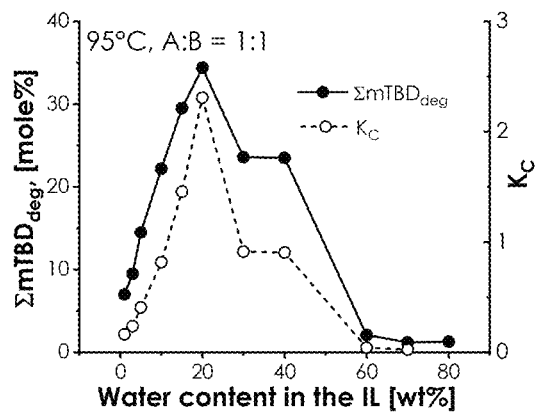
FIG. 10 shows the amount of the hydrolysis products and any acetamides subsequently produced under equilibrium conditions (ΣmTBDdeg, equ) and the equilibrium constant Kc as a function of the water content of [mTBD][OAc], A:B=1:1 at 95° C.

FIG. 10 shows the amount of the hydrolysis products and any acetamides subsequently produced under equilibrium conditions (ΣmTBDdeg, equ) and the equilibrium constant Kc as a function of the water content of [mTBD][OAc], A:B=1:1 at 95° C. The water content of the ionic liquid significantly influences the hydrolysis behaviour of the base in [mTBDH][OAc] as could be shown with an equimolar acid-base mixture.

Figure 11A:
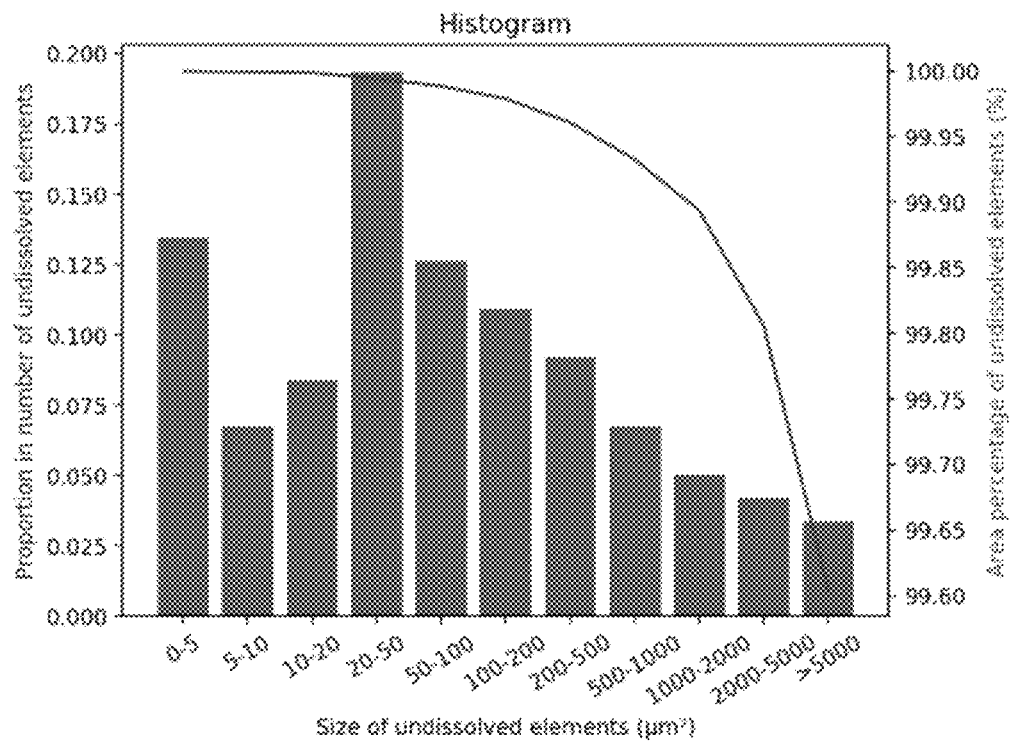
FIG. 11A: 0 wt % TBD.
Figure 11B:
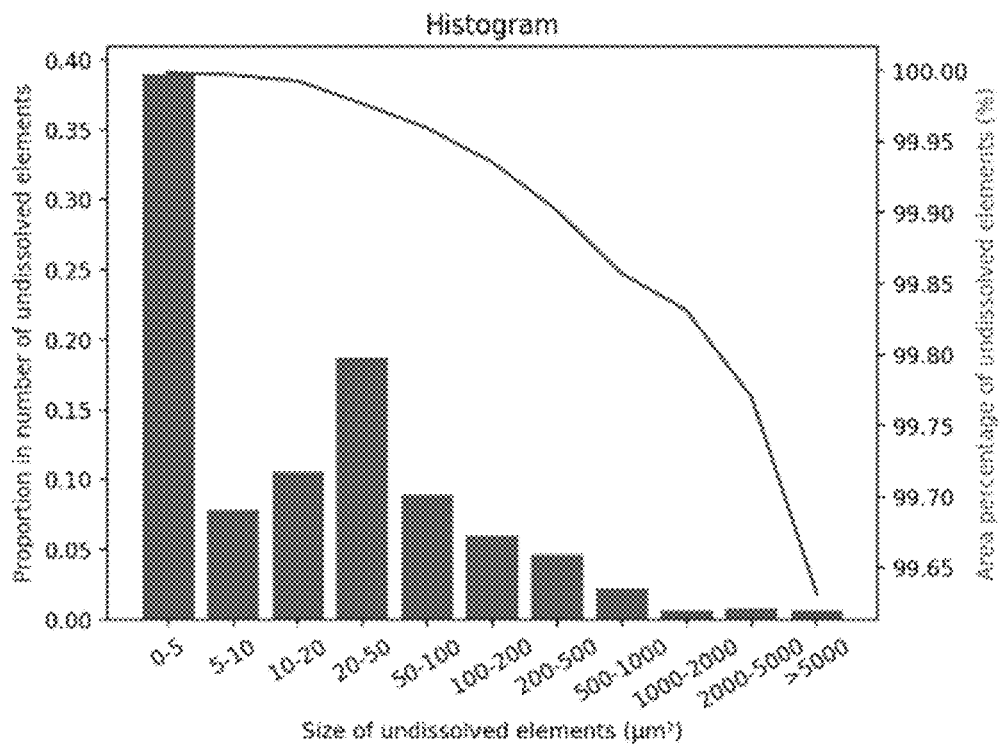
FIG. 11B: 30 wt % TBD.

FIG. 11 shows the proportional area of undissolved fiber elements in a 13 wt % Cellulose solution in [mTBDH](1-x)[TBDH]x[OAc]: FIG. 11A: 0 wt % TBD, FIG. 11B: 30 wt % TBD.

Figure 12:
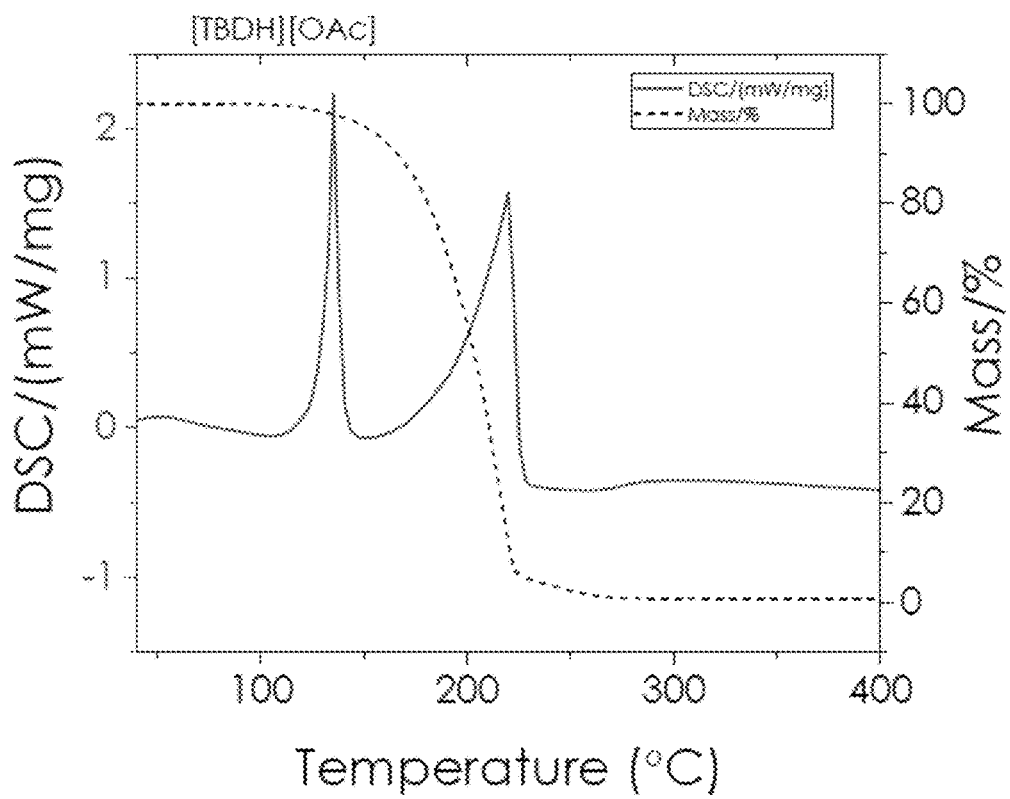
FIG. 12 shows a DSC and TGA diagram of [TBDH][OAc].

FIG. 12 shows a DSC and TGA diagram of [TBDH][OAc]. As can be seen from the DSC, [TBDH][OAc] has a melting point of 135° C. and therefore falls outside of the class of ionic liquids.

Figure 13:
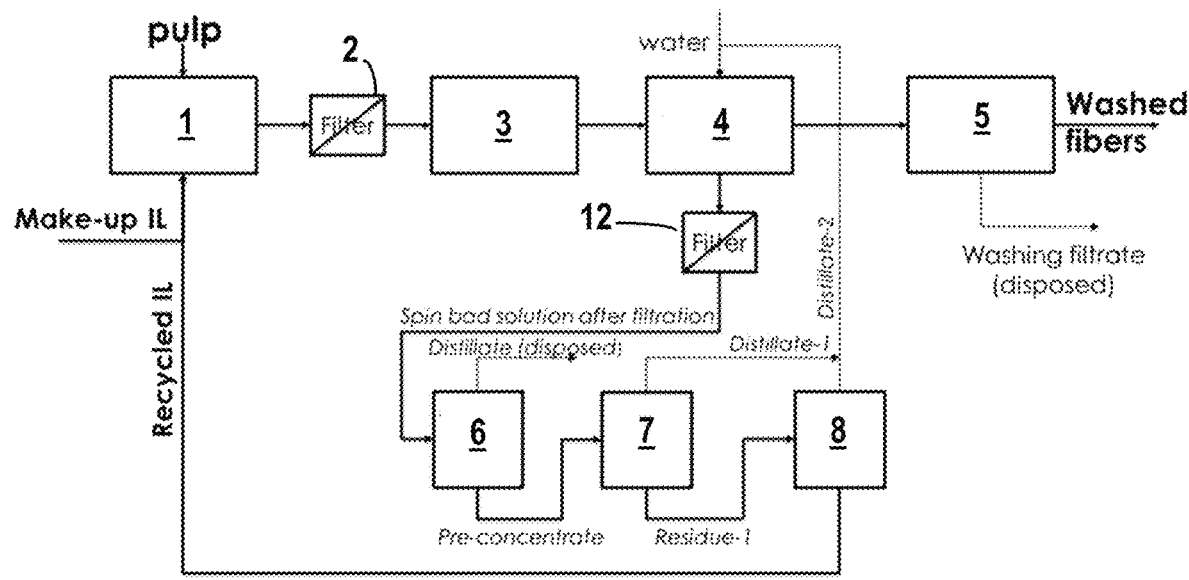
FIG. 13 shows a simplified scheme of the Ioncell® process on a laboratory scale integrated with ionic liquid recycling

FIG. 13 shows a simplified scheme of the Ioncell® process on a laboratory scale integrated with ionic liquid recycling. Pulp and ionic liquid are fed into a kneader unit (1) to dissolve pulp and provide a dope, which is passed through a filter (2) to filter out impurities. The filtered dope is then directed to a spinning unit (3) in which filaments are spun or films are extruded into a spin bath (4). After spinning or extruding the filaments or films are washed with water and stretched (5). Washed fibres are recovered and the washing filtrate from the washing and stretching unit (5) is disposed of. The spin bath (4) solution is filtered and directed to ionic liquid recovery. The spin bath solution is first centrifuged or subjected to evaporation in a preconcentration unit (6). Distillate from the preconcentration unit (6) is disposed of A preconcentrate from the preconcentration unit (6) is directed to a first thin film evaporation stage (7). The distillate from the first thin film evaporation stage (7) is directed to the spin bath (4) and the residue from the first thin film evaporation stage (7) is directed to a second thin film evaporation stage (8). Distillate from the second thin film evaporation stage (8) is directed to the spin bath (4) and recycled ionic liquid is recovered from the second thin film evaporation stage (8) and directed to the kneader (1) for dissolving further pulp.

Figure 14:
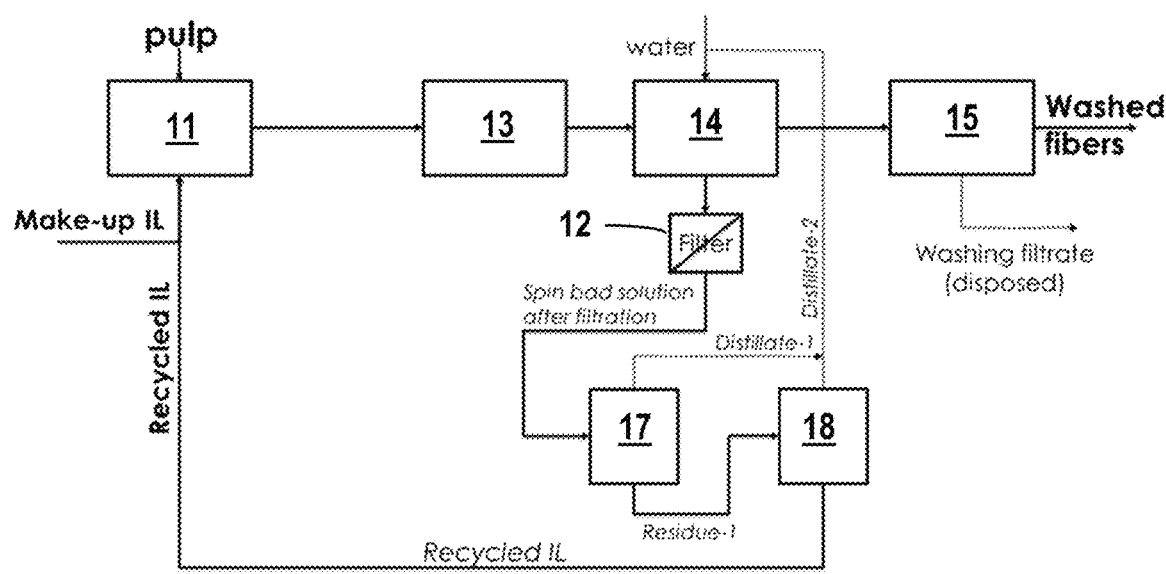
FIG. 14 shows a simplified scheme of the monofilament Ioncell® fiber spinning process integrated with ionic liquid recycling.

FIG. 14 shows a simplified scheme of the monofilament Ioncell® fiber spinning process integrated with ionic liquid recycling. Pulp and ionic liquid are fed into a kneader unit (11) to dissolve pulp and provide a dope. The dope is then directed to a spinning unit (13) in which filaments are spun or films are extruded into a spin bath (14). After spinning or extruding the filaments or films are washed with water and stretched (15). Washed fibres are recovered and the washing filtrate from the washing and stretching unit (15) is disposed of. The spin bath (14) solution is filtered in a filtering unit (12) and directed to ionic liquid recovery. and directed to a first thin film evaporation stage (17). The distillate from the first thin film evaporation stage (17) is directed to the spin bath (14) and the residue from the first thin film evaporation stage (17) is directed to a second thin film evaporation stage (18). Distillate from the second thin film evaporation stage (8) is directed to the spin bath (14) and recycled ionic liquid is recovered from the second thin film evaporation stage (18) and directed to the kneader (11) for dissolving further pulp.

Figure 15:
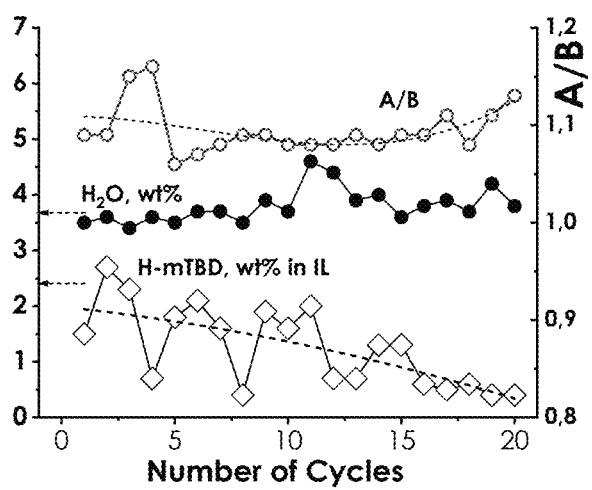
FIG. 15 shows the course of acid-base ratio (A/B), residual water content and concentration of hydrolysis products in the recycled ionic liquid during the 20 cycles.

FIG. 15 summarizes the course of the residual water content, the A/B ratio and the concentration of hydrolysis products in the recycled [mTBD][OAc]. It shows very clearly that the slight increase in the A/B ratio leads to a shift in the hydrolysis equilibrium towards an intact superbase. Therefore, adjusting the A/B ratio is the best leverage to minimize the hydrolysis of the superbase in the IL [mTBD][OAc].

As described above the present invention relates to a process for the production of cellulose filaments or films. In an embodiment the process comprises dissolving a dissolving a cellulose substrate in an ionic liquid consisting of the superbase cation 7-methyl-1,5,7-triazabicyclo[4.4.0]dec-5-enium [mTBDH]+ and an anion to produce a solution forming a spinning dope, said anion being derived from an acid which is present at a stoichiometric excess to the superbase. extruding the spinning dope through a spinneret in a coagulation bath containing water to form filaments or films or staple fibres from the solution; withdrawing ionic liquid in an aqueous mixture with water from the coagulation bath; recovering the ionic liquid [mTBDH][OAc] from the aqueous mixture by removing water and optionally recycling the recovered ionic liquid to the dissolution step.

By means of embodiments it has surprisingly been found that the guanidinium-based IL, [mTBDH] [OAc] (7-methyl-1, 5,7-triazabicyclo[4.4.0]dec-5-enium acetate) has a high tolerance to the presence of high amounts of the non-methylated synthesis precursor TBD (1,5,7-triazabicyclo [4.4.0]dec-5-ene). Even a proportion of 30 wt. % TBD in mTBD does not impair the excellent solubility properties of [mTBDH][OAc] in relation to cellulose for the manufacture of a spinnable 13 wt. % cellulose solution to high-strength MMCFs. This is an important finding since the content of a residual concentration determines the price of the mTBD. Benefits can be achieved by allowing a certain amount of residual water of up to 7.5% by weight in the IL—in addition to the water from the pulp—to be accepted without affecting the dissolving power, provided no other impurities are present.

The main disadvantage of superbases in their practical application is their high tendency to hydrolyse to an amine through ring opening reactions (two isomers) even in the presence of small amounts of water. This leads to an impairment of the solubility for cellulose in the formed ILs, which in turn leads to solvent losses if these by-products increase accordingly with an increasing number of cycles. This tendency is less pronounced for the guanidinium-based superbases than for the amidinium-based ones, but still clearly noticeable.

Surprisingly, it could be shown that, in contrast to [DBN-H][OAc], the hydrolysis rate of mTBD in IL [mTBDH][OAc] decreases very significantly in the presence of varying amounts of water at relatively low stoichiometric acetic acid surpluses, thus reducing the concentration of hydrolysis products (which have no cellulose dissolving capacity whatsoever) to an acceptable level. Even more surprising was the finding that the solubility with respect to cellulose is not affected even at an excess of acetic acid of up to 30 mole % in IL [mTBDH] [OAc]. Thus, in an embodiment the stoichiometric excess of the acid is up to 30 mole %, for example 0.1 to 30 mole %, preferably 10 to 20 mole %.

The spinning behaviour of the cellulose solution (dope) produced from it is also not negatively affected. This high tolerance of the IL [mTBDH] [OAc] to contents of residual water (<7.5 wt % or <5 wt % in combination with other parameters) hydrolysis products (<20 wt %) and excess acid (<30 mole %) provides the prerequisite for an almost loss-free recovery of IL by thermal and non-thermal water removal processes.

The fibre formation during the dry jet/wet spinning process takes place in a water bath, the spinning bath, into which the viscoelastic cellulose solution enters as filament after passing through a short air gap (5-20 mm). At the same time, fiber formation requires a high stretching of the filaments emerging from the spinnerets to 5-15 times the extrusion speed in order to obtain fibers with high strength. In a closed loop operation, including the washing steps, the ionic liquid and the degradation products, which originate both from the solvent and from the degraded solute, accumulate in the spinning bath. Under equilibrium conditions, the ionic liquid in the spinning bath can increase to a concentration of 10 to 30% by weight without impairing the regeneration behaviour of the cellulose[16]. The quantitative recycling of the ionic liquid requires both the purification of the ionic liquid and the removal of water. Thus, in an embodiment the process further comprises washing the staple fibers, filaments or films obtained from coagulation bath with water and withdrawing further ionic liquid in an aqueous mixture with water from said washing step.

Conjugated carboxylic acids of organic superbases can be distilled at relatively low temperatures, particularly in the range of 60 to 95° C. and low pressures, suitably in the range of 10-30 mbar. In one embodiment the anion is suitably a carboxylate, preferably acetate, formate or propionate.

As mentioned above it has been shown that the guanidinium based IL [mTBDH][OAc] is particularly suitable for the fibre process primarily because of its hydrolytic stability in the presence of water. In a preferred embodiment the ionic liquid consists of 7-methyl-1,5,7-triazabicyclo[4.4.0]dec-5-enium [mTBDH]+as cation and acetate as anion, the stoichiometric excess of acetic acid to 7-methyl-1,5,7-triazabicyclo[4.4.0]dec-5-ene in the ionic liquid being up to 30 mol %, preferably 10 to 20 mole %. Providing a stoichiometric excess of acetic acid as described reducing the concentration of hydrolysis products of mTBD to an acceptable level, meaning that the dissolving power of the ionic liquid is not inhibited. In an embodiment the level of hydrolysis products is <20 wt %.

The process according to embodiments may be applied to the dissolution of various diverse cellulosic substrates. In one embodiment the cellulose substrate is a paper pulp, a dissolving pulp, recycled cellulosic textile waste, recycled wastepaper, most suitably a bleached dissolving pulp.

In one embodiment the superbase mTBD may contain residues of the superbase 1,5,7-triazabicyclo[4.4.0]dec-5-ene (TBD) as an impurity in an amount of 0 to 30 wt %, preferably 0 to 10 wt %. Even a proportion of 30 wt. % TBD in mTBD does not impair the excellent solubility properties of [mTBDH][OAc] in relation to cellulose for the manufacture of a spinnable 13 wt. % cellulose solution to high-strength MMCFs.

As already mentioned, the decomposition of amidines and guanidines in water occurs by hydrolysis and not by an elimination reaction. During hydrolysis, a nucleophilic attack of the hydroxyl anion on the $sp^2$-hybridized carbon atom occurs[12], followed by cleavage of the carbon-nitrogen bond and, in the case of DBN (1-3-aminopropyl)-pyrrolidone=APP) and mTBD (two isomers: 1-[3-methyl-ammonio)propyl]-1,3-diazinan-2-one]=[H-mTBD-1] and 1-(3-ammoniopropyl)-3-methyl-1,3-diazinan-2-one]=[H-mTBD-2]) primary amine structures are formed. As shown in FIGS. 2 and 3 (schemes), the hydrolysis is an equilibrium reaction and can therefore be shifted back to the superbase (s) by suitable reaction conditions, such as acid catalysis. In the presence of the acetate anion in an ionic liquid, however, the hydrolysis products are converted to the corresponding acetamides. These consecutive reactions are irreversible, so that there is no possibility of restoring the original superbase (FIGS. 2 and 3).

The guanidine structure of mTBD enables the formation of two isomeric hydrolysis products and subsequently two isomeric acetamides. The disappearance of the superbases and the formation of the hydrolysis and acetamide products can easily be followed quantitatively over time using 1H-NMR spectroscopy. We will see later that the two hydrolysis isomers have a significantly different rate of formation and decomposition.

It has already been reported that the guanidines are more stable against hydrolysis than the amidine structures due to their higher electron density at the $sp^2$-hybridized carbon. In the case of the amidine DBN, hydrolysis is energetically favored by the relief of the ring stress[12].

[DBNH][OAc], which is recovered from the spinning bath after only one cycle, already contains a concentration of hydrolysis products, [APPH][OAc], which is too high to completely dissolve cellulose in a subsequent step. This makes the ionic liquid [DBNH][OAc] unsuitable for the Ioncell® process.

To verify this, kinetic investigations were performed in which the acetic acid in the ionic liquid was superstoichiometrically increased up to a ratio of [HOAc]: [DBN]=5:3, which corresponds to its azeotropic mixture [26]. The results are shown in FIG. 4. Interestingly, the azeotrope is richer in acid due to its higher ability to generate H-bonds with the ion pair[27]. Despite such a high acid to base ratio of 5:3, DBN degradation is hardly slowed down compared to the equimolar acid to base composition, especially in the first hours. In the composition of the azeotrope (A:B=5:3), a slightly higher equilibrium concentration of DBN is achieved. However, this behaviour is irrelevant for the Ioncell® process. Since acetic acid is a non-solvent, the ionic liquid is no longer a cellulose solvent at an acid-base ratio of 5:3.

Due to the increasing volatility of the base with increasing concentration, the composition of the ionic liquid shows a higher acid content after the evaporation of water. Together with a relatively high content of hydrolysis products ([APPH][OAc]), this means that [DBNH][OAc] has lost its ability to dissolve cellulose after only one recovery cycle (table 2).

TABLE 2

Composition of freshly prepared and once recycled [DBNH][OAc]. The latter by evaporation in a thin film evaporator

| | [DBNH][OAc] | | | Water | |
|---|---|---|---|---|---|
| Cycle | Concentration wt % | Acid-to-base mole/mole | [APPH] wt % | av wt % | stdev Wt % |
| Fresh IL | 99.8 | 0.99 | 0 | 0.1 | ±0.01 |
| 1 | 86.4 | 1.27 | 14.4 | 3.3 | ±0.10 |

The ability of [DBNH][OAc] to dissolve cellulose at a concentration of 13% by weight is terminated at a residual water content of 3%, an acid-base ratio of 1.05-1.10 and an [APPH] content of 10 mole %.

As can be understood from the above, the ability of recovered ionic liquid [mTBDH][OAc] to dissolve cellulose is not impaired by its hydrolysis products at the same content of hydrolysis products as the DBN analogue, but only becomes impaired at a much higher content of hydrolysis products and acetamides. In an embodiment the recovered ionic liquid, [mTBDH][OAc], contains one or several of the following hydrolysis products: 1-[3-(methylammonium)propyl]-1,3-diazinan-2-one acetate ([H-mTBDH-1][OAc]), 1-(3-ammoniopropyl)-3-methyl-1,3-diazinan-2-one acetate ([H-mTBDH-2] [OAc]), in an amount of <20 wt %, preferably <10 wt %, suitably <5 wt %, calculated from the weight of the recovered ionic liquid.

Evaporation is the most commonly used process for the removal of water from the ionic liquid-water mixtures originating from the combined spin and water baths. Alternative processes such as membrane separation with pressure-driven membrane technologies, pervaporation, membrane distillation and electrodialysis are interesting, but too expensive according to the current state of development and also show no energy advantage over multi-stage evaporators.

The preferred method for removing water from the ionic liquid is a combination of multi-stage falling film and thin film evaporators, optionally combined with vapor recompression evaporation. In one embodiment the ionic liquid, [mTBDH][OAc], is recycled by removing water from the aqueous mixture of the ionic liquid in a cascade of water-removal steps. In a further embodiment water is removed from the aqueous mixture by one or several evaporators selected from the group of falling film evaporators, thin film evaporators and vapor recompression evaporators and combinations thereof. As already mentioned, the equilibrium concentration of the ionic liquid in the mixture of spin bath and wash filtrate(s) ranges between 10 and 30%. As detailed experiments have shown, it is not necessary to quantitatively remove the water from the ionic liquid in order to achieve good dissolving and spinning behaviour of the cellulose solution in the next spinning cycle. A residual water concentration of <7.5 wt %, suitably 1 to 5%, preferably 3%, is tolerable and allows a stable process behaviour of the ionic liquid [mTBDH][OAc]. In a preferred embodiment the amount of water present in the recovered ionic liquid amounts to <7.5 wt %, preferably 3-5 wt %, most suitably <3 wt %, calculated from the total weight of the recovered ionic liquid and the water.

In a suitable embodiment water is removed from the aqueous mixture in one or several multiple-effect evaporation plants comprising two or more evaporators selected from the group of falling film evaporators, thin film evaporators and vapor recompression evaporators and combinations thereof.

Filaments or films or staple fibres are formed in a coagulation or spinning bath. In an embodiment, the coagulation or spinning bath comprises ionic liquid. In a preferred embodiment the process comprises forming filaments or films or staple fibres in a coagulation bath or spinning bath containing ionic liquid in a concentration of 40 wt % or less.

Similarly, the washing step may involve water comprising an ionic liquid. In a particular embodiment the washing step comprises washing the filaments or films or staple fibres with water at an ionic liquid concentration of 40 wt % or less.

In a further embodiment the aqueous mixture withdrawn from the coagulation bath or from the washing step contains 40 wt % or less of ionic liquid.

An embodiment may be used for the production of fibres having certain properties. In an embodiment the process comprises producing a cellulose fiber having a dry tenacity ≥35 cN/tex, a wet-to-dry tenacity of >0.80 and a modulus of toughness of ≥50 MPa, preferably a dry tenacity ≥40 cN/tex, a wet-to-dry tenacity of >0.85 and a modulus of toughness of ≥60 MPa. Tenacity (cN/tex), elongation at break (%), and linear density (dtex) were determined on a Favigraph device (Textechno, Germany). Test parameters: 20 cN load cell, 10 mm gauge length, 10 mm min$^{-1}$ test speed, 100 mg pretension, fiber count 20. Measurements are carried out in a conditioned state: 20° C., 65% relative humidity and wet state, 10 s wetting prior to testing.

The modulus of toughness is calculated as the integral of the stress-strain curve. The results (integral) are obtained in J/g and multiplied by 1.5 for the density of the cellulose, the unit MPa is obtained.

In a further embodiment the process is used for producing textile fibres. technical fibres or a film.

The above-mentioned improved hydrolytic stability of mTBD versus DBN in the presence of water was investigated for the corresponding ionic liquids [mTBDH][OAc] and [DBNH][OAc] in equimolar acid-base composition at uniform 95° C. and 85° C. and a water content of 10% by weight. FIGS. 5 and 6 show the significant difference in the hydrolytic stability of the two ILs, especially during the first hundred hours.

The most striking difference in the hydrolysis behaviour between DBN and mTBD is apparent within the first five hours. While a massive DBN degradation of 37% at 95° C. (29% at 85° C.) occurs, the mTBD degradation remains very moderate at only 4% (1.5% at 85° C.). The formation of acetamide from DBN begins after five hours already, immediately after reaching the maximum APPH concentration, and then rises steeply to a concentration of 38 mole % after 480 hours. Thus, more than 77% of the original DBN amount is converted into acetamide, but only 6% remains as hydrolysis product APP.

The mTBD-derived acetamide can only be detected after a hydrolysis time of about 100 h and remains insignificant even after 300 h at 85° C. Despite the presence of two isomeric hydrolysis products in the case of mTBD, the further reaction to the corresponding amides seems to be significantly inhibited compared to the DBN analogue. As shown in FIG. 7, the formation of H-mTBD-1 is preferred and also the subsequent reaction to acetamide.

Overall, the question therefore arises as to whether the higher stability of mTBD is sufficient to allow continuous recovery of the ionic liquid with minimal make-up amounts. At the same time, a composition of the ionic liquid in equilibrium must be ensured, which enables perfect spinning behaviour.

Since the ionicity of [mTBDH][OAc] is higher than that of [DBNH][OAc] (see above), the acid-to-base composition of the azeotropic mixture is 3:2 and thus slightly lower than that of the latter[28]. Nevertheless, the recovered IL is expected to have a superstoichiometric acid-base ratio.

Since in the case of [DBNH][OAc] even a very small stoichiometric excess of acetic acid means that cellulose can no longer be completely dissolved, we initially expected a similar reaction of the ionic liquid [mTBDH] [OAc] and did not want to further investigate the effect of a stoichiometric excess of the acid in the case of mTBD.

Nonetheless, a decision was taken to investigate the influence of the molar acid-to-base ratio on the hydrolysis kinetics of [mTBDH][OAc]. Specifically, at a temperature of 95° C. and a water content of 10% by weight, the acid-to-base molar ratio was gradually increased from 1:1 over 1.1:1 to 1.2:1, which may correspond to the possible equilibrium settings of the recycled ionic liquid. In order to be able to evaluate the possible differences also quantitatively, the results were modelled using a kinetic model in which, for the sake of simplicity, the sum of the by-products was described as one species, $[\Sigma mTBD_{deg}]$:

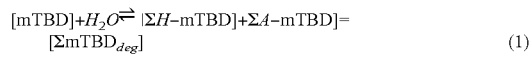

$$[mTBD] + H_2O \rightleftharpoons [\Sigma H-mTBD] + \Sigma A-mTBD] = [\Sigma mTBD_{deg}] \quad (1)$$

Forward (k1) and backward (k2) reactions are both pseudo-first order. Thus, the concentration of mTBD after time t, $[mTBD]_t$ can be calculated by equation (2):

$$[mTBD]_t = [mTBD]_0 \{(k_2 + k_1 e^{-(k1+k2)t})/(K_1 + k_2)\} \quad (2)$$

The equilibrium concentration of mTBD, $[mTBD]_\infty$, is estimated by equation (3), $$[mTBD]_\infty = k_2 [mTBD]_0 / (k_1 + k_2) \quad (3)$$

and the equilibrium constant $K_c = d[mTBD]/dt = 0 \rightarrow k_1 [mTBD] = k_2 [\Sigma mTBD_{deg}]$ with equation (4)

$$K_c = [\Sigma mTBD_{deg}]/[mTBD]_\infty = k_1/k_2 \quad (4)$$

In contrast to [DBNH][OAc], even a slight stoichiometric excess of acetic acid causes a significant stabilization of the cation in the ionic liquid [mTBDH][OAc] (FIG. 8). This is also reflected by the kinetic coefficients (Table 3).

TABLE 3

Kinetic coefficients of the degradation of [mTBD] in the ionic liquid, [mTBDH][OAc], with different acid-base molar ratio at 95° C. and in the presence of 10 wt % water

| Parameter | unit | [HOAc]:[mTBD] | | |
|---|---|---|---|---|
| | | 1.0:1.0 | 1.1:1.0 | 1.2:1.0 |
| $[mTBD]_0$ | mole % | 48.5 ± 0.5 | 46.9 ± 0.4 | 45.5 ± 0.1 |
| $k_1$ | $h^{-1} \times 10^3$ | 3.94 ± 0.21 | 2.26 ± 0.12 × $10^{-3}$ | 1.60 ± 0.03 |
| $k_2$ | $h^{-1} \times 10^3$ | 1.10 ± 0.13 | 1.54 ± 0.14 × $10^{-3}$ | 1.44 ± 0.06 |
| $[mTBD]_\infty$ | mole % | 10.6 | 19.0 | 21.5 |
| $K_c$ | | 3.6 | 1.5 | 1.1 |

It was very unexpected that this small acid excess of 20 mole-% reduces the equilibrium constant by a factor of 3.3 and the reaction constant k1 by a factor of 2.5, while an acetic acid excess of 66 mole-% has little effect on the reaction coefficient k1 in the case of [DBNH][OAc]. It is particularly remarkable that the stabilizing effect of an excess of acetic acid is very pronounced in the first few hours. This fact is particularly relevant for the recovery of IL by thermal evaporation of water (FIG. 9).

At this point we only know that a small excess of acetic acid in [mTBDH][OAc] has an exceptionally high effect on base stabilization. However, we do not yet know whether an excess of 20 mol % of a non-solvent has a negative effect on the ability of the ionic liquid to dissolve cellulose and, if so, whether the resulting cellulose solution is spinnable.

It is also remarkable that the water content of the ionic liquid significantly influences the hydrolysis behaviour of the base in [mTBDH][OAc] as could be shown with an equimolar acid-base mixture. As characteristic values in FIG. 10, both the amount of decomposition products (sum of hydrolysis products and acetamides) and the equilibrium constant Kc against the water content were plotted.

Interestingly, the highest tendency for hydrolysis of the superbase in the ionic liquid is observed at a water content of 20 wt %. The decreasing hydrolysis rate at lower water contents can be explained by the decreasing water activity with increasing salt concentration. The available concentration of hydroxyl anions thus increases up to a water content of 20 wt. % before it decreases again through further dilution. A recent simulation study has confirmed a maximum of the combined activity coefficients of water and mTBD at a water content of the IL of about 20 wt %. It is interesting that even at 95° C. and a hydrolysis time of more than six weeks, the superbase mTBD in the corresponding IL remains almost completely stable at water concentrations of more than 60 percent. As a consequence of these unexpected results, it can be concluded that [mTBDH] hardly hydrolyses at all both at the low temperatures in the coagulation bath and at the high temperatures in the wash water. Knowing that the highest hydrolysis rates occur between water contents of 10-40%, thermal water evaporation processes can be designed to keep residence times in this water content range as short as possible.

The final step in the synthesis of mTBD involves the methylation of TBD (1,5,7-triazabicyclo[4.4.0]dec-5-ene) by an alkylating agent such as dimethyl carbonate (DMC). The degree of residual contamination with TBD determines the price of the superbase. For this reason, it was investigated which residual concentrations of TBD can be tolerated without affecting the dissolving and spinning behaviour of [mTBDH][OAc]. The effect of different concentrations of TBDH in mTBDH in an IL [mTBDH](1-x)[TBDH]x[OAc] was investigated in example 1.

EXAMPLES

Example 1

In the first series of experiments, the extent of cellulose dissolution to produce a solution with a cellulose content of 13% by weight was monitored by optical microscopy using a cross-polarized mode. The image analysis method is based on estimating the white/colored surface ratio of the undissolved elements appearing in the total area of the image. The method is described in detail in [29]. The results presented in Table 4 show that the quality of the solution is almost not affected up to a TBD content of up to 30% in the IL.

TABLE 4

Dissolution trials in the presence of TBD in the IL [mTDH][OAc]

| TBD in solution wt % | Acid-to-total Base mole/mole | Pulp* concentration wt % | Extent of dissolution** % | Image |
|---|---|---|---|---|
| 0 | 1 | 13 | 99.6 | FIG. 11A |
| 5 | 1 | 13 | 99.9 | |
| 10 | 1 | 13 | 99.9 | |
| 20 | 1 | 13 | 99.8 | |
| 30 | 1 | 13 | 99.6 | FIG. 11B |

*Pulp: Birch prehydrolysis kraft pulp
**optical microscope: area of dissolved fibers

Example 2

Following these promising dissolution results, large batches of cellulose solution were prepared using 0, 5 and 10 wt % TBD in the IL with an acid/total base ratio of 1:1. The results showed that up to a TBD concentration of 10 wt % no influence on the rheology of the prepared spinning solution, spinning behaviour or fiber properties could be observed. The results are summarized in Table 5.

TABLE 5

Rheology of a 13% by weight pulp* solution prepared from [mTBDH][OAc] with different fractions of mTBD replaced by TBD (dissolution at 80° C.-85° C. for 60-75 min). Properties of Ioncell fibers spun from the pulp solutions by a dry-jet wet-spinning process with a draw ratio (DR) of 11.

| TBD in solution wt % | Rheology of 13 wt % solution at 85° C. | | | Titer dtex | Tenacity cN/tex | Elongation % | E-modulus GPa |
|---|---|---|---|---|---|---|---|
| | [η*0] Pa · s | ωCOP 1/s | G' = G" Pa | | | | |
| 0 | 23 676 | 0.98 | 3 839 | 1.2 ± 0.1 | 46.8 ± 3.0 | 7.8 ± 1.4 | 17.9 ± 1.7 |
| 5 | 18 324 | 1.09 | 3 359 | 1.3 ± 0.2 | 50.1 ± 5.1 | 7.3 ± 1.1 | 18.8 ± 2.7 |
| 7.5 | 22 060 | 0.73 | 2 742 | n.m. | n.m. | n.m. | n.m. |
| 10 | 31 098 | 0.75 | 3 972 | 1.3 ± 0.2 | 53.3 ± 4.7 | 7.2 ± 0.6 | 19.5 ± 2.1 |

The results in Table 5 confirm that there is no negative influence of TBD on the spinning behaviour (rheology) of the cellulose solution and on the fiber quality of the fibers spun from it, at least up to a concentration of 10% by weight in the IL.

Since [TBDH][OAc] does not belong to the ionic liquid category due to its melting point of 135° C. (FIG. 12), it was not trivial to expect that the ionic liquid [mTBDH][OAc] could tolerate a TBD content of up to 30% by weight without affecting cellulose solubility.

Example 3

In addition to the TBD content, residual water and al mTBD content (FIG. 3) as well as the acid-base ratio (AB) influence the dissolution behaviour of [mTBDH] [OAc], the rheology of the resulting cellulose solution as well as the spinnability and fiber properties. The effects of both individual and combined parameter deviations from the ideal [mTBDH]OAc] composition (water=0%, ΣH mTBD=0%, A/B=1:1) have been carefully studied.

Solubility studies of a Birch prehydrolysis kraft pulp in 13 wt % concentration at 80° C.-85° C. for 60-75 min have shown that the A/B ratio, which has a considerable influence on base hydrolysis (FIG. 8), can be increased up to 1.3:1 at a ΣH mTBD of 0 wt % and a water content of 1% without affecting the cellulose dissolving and fiber spinning ability. The water content can be increased up to 7.5% when the A/B ratio is 1:1 and no ΣH mTBD is present. Interestingly, even with a residual water content of 3% and an A/B ratio of 1.2:1, the IL is very insensitive to the presence of up to 20% by weight ΣH mTBD. The results are summarized in Table 6.

TABLE 6

Effect of single and combined deviations of the parameters water content, A/B ratio and ΣH mTBD from the ideal composition of [mTBDH][OAc]. The quality of solution was determined by optical microscopy using a cross-polarized mode [29]. The composition of pure [mTBDH][OAc] has been modified according to the information in the table. A birch PHK pulp was used in all cases to produce a 13% by weight solution

| H₂O wt % | A/B mole/mole | ΣH mTBD Wt % | Extent of dissolution % (area) |
|---|---|---|---|
| 1.0 | 1.0 | 0 | 99.8 |
| 7.5 | 1.0 | 0 | 99.7 |
| 10.0 | 1.0 | 0 | 92.6 |
| 1.0 | 1.2 | 0 | 99.9 |
| 1.0 | 1.3 | 0 | 99.9 |
| 1.0 | 1.4 | 0 | 91.8 |
| 3.0 | 1.2 | 5 | 99.7 |
| 3.0 | 1.2 | 10 | 99.8 |
| 3.0 | 1.2 | 20 | 99.6 |
| 5.0 | 1.2 | 5 | 95.4 |
| 5.0 | 1.2 | 10 | 90.5 |

The extent of dissolution higher than 99% can be rated as very good, values below 95% are not acceptable for a uniform spinning process.

Fiber production according to a Lyocell (Ioncell) process with recycled [mTBDH] [OAc]

Surprisingly, experiments showed that the ionic liquid [mTBDH][OAc], which was successively recycled by thermal water removal from spinning and washing waters, did not lose its ability to dissolve cellulose and at the same time the extent of hydrolysis of the superbase (ΣH mTBD) had stabilized at a low level. It was also surprising that the cellulose solution (10-17 wt %) produced from the recycled [mTBDH][OAc] could be spun into high-strength Lyocell fibers (Ioncell®) with high uniformity and stability using the air gap process.

In the following, examples are described in detail in which the ionic liquid [mTBDH][OAc] is used in the spinning process and recovered from the spinning baths by multi-stage evaporation processes in order to be used again in a subsequent spinning experiment. These experiments are then repeated with varying frequency depending on the example.

Example 4

The ionic liquid (IL) [mTBDH][OAc] was prepared by mixing the base and the acid in equimolar ratio with continuous stirring for one hour at a temperature below 70° C.

A 13 wt % cellulose solution (dope) in [mTBDH][OAc] was produced in a vertical kneader (FIG. 13, unit 1) using a birch prehydrolysis pulp (PHK) with an intrinsic viscosity of 494 mL/g. Complete dissolution was achieved within 60-75 min at 85° C. and 15 mbar and a stirring speed of 30 rpm. The hot dope was filtered with a hydraulic press through a metal fleece with a hole diameter of 5-6 μm. As the rheological properties of the cellulose solution are decisive for the spinning behaviour, these were measured with an Anton Paar MCR 300 rheometer with a plate and plate geometry (25 mm plate diameter, 1 mm gap size). Each sample was subjected to a dynamic frequency sweep over an angular frequency range from 0.01 to 100 s-1 at a series of temperatures that included the required rheological parameters with a complex viscosity of 25000-35000 Pas, a complex modulus at the cross-over point (COP) of 3000-4500 Pa and an angular frequency of the COP (ωCOP) of 0.5 to 1.5 s-1 [30]. The 13 wt % cellulose solution, prepared from freshly synthesized IL, showed the desired rheological properties at 85° C. The results of the rheological characterization are summarized in Table 7 together with the results of the cellulose solutions produced from IL recycling.

TABLE 7

Rheological properties of fresh and recycled dopes prepared from [mTBDH][OAc] and birch PHK pulp at a concentration of 13 wt % at 85° C.

| Cycle | Temperature ° C. | Complex viscosity $\eta_0^*$ [Pa · s] | Angular frequency ω at COP [s$^{-1}$] | Complex modulus G' = G'' at COP [Pa] |
|---|---|---|---|---|
| 1 (Fresh) | 85 | 28 953 | 0.78 | 3776 |
| 2 | 85 | 28 500 | 0.84 | 3996 |
| 3 | 85 | 31 200 | 0.74 | 3918 |
| 4 | 85 | 26 835 | 0.81 | 3630 |
| 5 | 85 | 32 890 | 0.76 | 4203 |
| Average | 85 | 29 676 | 0.79 | 3905 |
| Stdev | 0 | ±2 379 | ±0.04 | ±218 |

Fibre spinning was performed with a customized laboratory piston spinning unit (Fourné Polymertechnik, Germany). The cylinder was loaded with cooled, solidified and shaped [mTBDH][OAc]-pulp solution heated to 85° C. to form an air bubble-free spin dope. The temperature was kept between 83-87° C. while it was extruded through a 200-holes spinneret (capillary diameter 100 µm, L/D 0.2) via a 1 cm airgap into a water coagulation bath. The temperature of the coagulation bath was kept constant at 8-10° C. The extrusion rate was fixed at 3.5 m/min while the take-up velocity was 42 m/min resulting in a draw ratio (DR) of 12. The spun fibers were collected as endless filaments, cut into staple fibers and thoroughly washed in demineralized water. The properties of the resulting regenerated cellulose fibers are compiled in table 8. The fibers spun from the dope made of freshly prepared ionic liquid (cycle 1) show comparable properties to those spun from dope prepared from [DBNH][OAc] with the same DR. The total orientation is very high which also explains the relatively low elongation. For the development of textile fibres of the highest quality, the overall orientation must be somewhat reduced in favor of greater toughness.

TABLE 8

Mechanical and structural properties of Ioncell-F fibers spun from birch PHK solutions in [mTBDH][OAc]

| Cycle | Titer dtex | Tenacity cond [cN/tex] | Elongation cond [%] | Tenacity wet [cN/tex] | Elongation wet [%] | Orientation (birefringence) |
|---|---|---|---|---|---|---|
| 1 | 1.2 ± 0.3 | 49.9 ± 3.8 | 9.5 ± 1.2 | 49.4 ± 6.2 | 11.8 ± 1.7 | 0.698 ± 0.062 |
| 2 | 1.3 ± 0.2 | 48.4 ± 2.8 | 9.3 ± 0.6 | 47.9 ± 3.2 | 10.6 ± 0.7 | 0.671 ± 0.064 |
| 3 | 1.2 ± 0.2 | 52.8 ± 3.2 | 10.1 ± 1.0 | 51.0 ± 2.2 | 12.1 ± 0.9 | 0.726 ± 0.111 |
| 4 | 1.3 ± 0.2 | 39.8 ± 4.6 | 7.5 ± 1.7 | 41.9 ± 0.4 | 9.1 ± 0.8 | 0.734 ± 0.041 |
| 5 | 1.2 ± 0.2 | 38.6 ± 3.3 | 8.5 ± 1.2 | 39.0 ± 2.6 | 9.2 ± 0.8 | 0.719 ± 0.069 |

Example 5

After spinning, the combined spin bath (unit (3) in FIG. 13) and the distillates from the two thin film evaporator stages (TFE-1 and TFE-2) were subjected to pre-concentration in a centrifugal evaporator (unit (5) in FIG. 13). After spinning, the mixture from the spinning bath and the distillates of the two Thin Film Evaporator stages (TFE-1 and TFE-2, units (6) and (7) in FIG. 13) were pre-concentrated in a centrifugal evaporator. Due to the high volume of the distillate from the centrifugal evaporator, the distillate was not recycled. The amount of hydrolysis products in the distillate was below the detection limit due to the low temperature of the spin bath and as well as during evaporation and the high dilution of IL in the feed and concentrate. As shown in FIG. 13, the residue from the centrifugal evaporator was fed into TFE-1 (unit (6) of FIG. 13) and that from TFE-1 into TFE-2 (unit (7) of scheme 3) to remove the amount of water required to completely dissolve the pulp in the following cycle. The two distillation streams of TFE-1 and TFE-2 were collected and added to the spinning bath of the next cycle. Table 9 shows the residual water contents before and after the respective distillation stages.

TABLE 9

Residual water concentrations of the IL streams before and after the consecutive evaporator units measured by Karl-Fischer (KF) titration.

| Cycle | Before Unit (5) | Before Unit (6) | Before Unit (7) | Recycled IL |
|---|---|---|---|---|
| Fresh IL | | | | 0.2 ± 0.01 |
| 1 | 98.9 ± 0.10 | 54.4 ± 1.2 | 15.1 ± 1.1 | 3.1 ± 0.1 |
| 2 | 98.8 ± 0.20 | 76.9 ± 0.5 | 14.3 ± 0.3 | 2.2 ± 0.05 |
| 3 | 99.2 ± 0.04 | 93.7 ± 0.4 | 29.2 ± 1.2 | 2.7 ± 0.05 |
| 4 | 99.7 ± 0.02 | 90.7 ± 0.4 | 26.6 ± 0.8 | 2.8 ± 0.02 |
| 5 | 99.7 ± 0.01 | 92.8 ± 0.6 | 57.6 ± 3.2 | 2.6 ± 0.04 |

The IL concentration after spinning of approx. 0.7-1.5 kg cellulose solution into the coagulation bath with a volume of 120 L resulted in a very low IL concentration before evaporation. Only a very old and unreliable centrifugal evaporator was available for pre-concentration. Due to many technical problems, the IL concentration after preconcentration was generally low (especially after cycles 3-5) and with a large scatter. However, the large variation in water content was well compensated by the two subsequent thin film evaporators, so that the water content of the recycled IL (after TFE-2, unit (7)) was generally below 3 wt. % and showed only small variations from cycle to cycle (table 9). Thus, despite technical shortcomings, a water content in the recycled IL could be adjusted very reliably, which was significantly below the limit value for the solubility of cellulose. A water content of ≤7.5% by weight in the IL can be tolerated for complete dissolution of the cellulose, provided the acid-to-base ratio is close to 1:1 and the amount of hydrolysis products, ΣH-mTBD, is insignificant (Table 6)[29].

In the presence of water, the superbase-based ionic liquid, [mTBDH][OAc], undergoes hydrolysis reaction producing undesirable hydrolysis products such as [H-mTBD-1][OAc] and [H-mTBD-2][OAc] (FIG. 3). From the results of the hydrolysis kinetics experiments it can be concluded that hydrolysis can be delayed by low temperatures, very low (<5%) or large water contents (>40-60%) and higher acid-to-base ratios (FIG. 5, 5 and Table 3). The question arises whether, under the conditions of spinning, fibre washing and subsequent evaporation of the water from the collected IL streams, a concentration of hydrolysis products in the recycled IL is achieved that is not acceptable for reintroduction into the spinning process. To our surprise, the concentration of hydrolysis products in both distillates and concentrates remained at a low level, well below a critical value for the solubility of recycled IL (see table 10)

reduced possibility of setting the optimum spinning conditions. Furthermore, the very high overall orientation of the fiber molecules, especially in cycle 4, indicates that the selected draw ratio was too high, so that some microfibrils were already mechanically damaged.

TABLE 10

Composition of the fresh and recycled ILs and the distillate streams recycled back to the spin bath

| | Fresh and recycled Ionic Liquid | | | | Distillate stream | | |
|---|---|---|---|---|---|---|---|
| | [mTBDH][OAc] | | | | [mTBDH][OAc] | | H-mTBD-1 |
| Cycle | wt % | Acid-to-Base [molar ratio] | H-mTBD-1 wt % | Water wt % | [wt % of feed IL] | Acid-to-Base [molar ratio] | [wt % of feed IL] |
| Fresh | 99.8 | 0.99 | | 0.2 ± 0.01 | | | |
| 1 | 96.4 | 1.10 | 0.5 | 3.1 ± 0.09 | 1.5 ± 0.03 | 0.06 | 0.37 ± 0.01 |
| 2 | 96.8 | 1.10 | 1.0 | 2.2 ± 0.05 | 0.9 ± 0.03 | 0.11 | 0.27 ± 0.01 |
| 3 | 95.8 | 1.11 | 1.5 | 2.7 ± 0.05 | 0.6 ± 0.03 | 0.07 | 0.16 ± 0.02 |
| 4 | 94.5 | 1.16 | 2.6 | 2.8 ± 0.02 | 0.2 ± 0.02 | 0.24 | 0.98 ± 0.14 |
| 5 | 94.9 | 1.14 | 2.5 | 2.6 ± 0.04 | 0.3 ± 0.07 | 0.15 | 0.18 ± 0.002 |
| Average | 95.7 ± 1.0 | 1.12 ± 0.03 | 1.6 ± 0.9 | 2.7 ± 0.3 | 0.7 ± 0.5 | 0.13 ± 0.07 | 0.39 ± 0.34 |

| Solubility limit | | | |
|---|---|---|---|
| Individual effects | ≤1.30 | ≤20 wt % | ≤7.5 wt % |
| Combined effects | ≤1.20 | ≤20 wt % | ≤5 wt % |

As Table 10 shows, the concentration of hydrolysis products [ΣH-mTBD] in 5 the recycled IL remained well below the limit concentration permissible for complete solubility of 13 wt % cellulose (Table 6) [29].

No real trend of an increase in the concentration of hydrolysis products over the cycles was observed. However, a small increase of the acid-base ratio (A:B) in the recycled IL to a value of 1.12±0.03 is clearly visible. Besides the slight conversion of the superbase into its hydrolysis products, the reason for the enrichment of the recycled IL in the acid component can be attributed to the preferred vaporization of the base due to the higher ability of the acid to form H-bonds with the ion pair [27]. The higher volatility of the base in a PIL is reflected in the very low A:B ratio of the distillate(s) (Table 10). The A:B ratio of recycled [mTBDH][OAc] remains significantly lower than that of recycled [DBNH][OAc], which reaches an A:B ratio of 1.27 already after the first cycle. This difference also corresponds to the higher acid-to-base ratio of the azeotropic mixture of 5:3 for [DBNH][OAc] compared to 3:2 for [mTBDH][OAc] (Tables 2 and 10).

The results of the five complete recycling experiments of the cellulose solvent [mTBDH][OAc] show that despite its tendency to hydrolysis reactions and the incomplete ionicity of the PIL, the properties of the recycled IL hardly differ from those of a freshly produced IL and can therefore fully preserve the dissolving capabilities of cellulose. This is reflected in the almost constant rheological properties of cellulose solutions (table 7) produced with IL recycling and the high quality of the fibers spun (table 8) from them. The slight decrease in the mechanical properties of the fibers of cycles 4 and 5 (table 8) can be explained by the very small amount of cellulose solution available and the associated Example 6: 20 recovery cycles of the IL used In a new test series, a monofilament spinning system was used which, due to the low volume of the spinning bath, allows a higher number of recycling trials. The simplified process scheme (FIG. 14) consists of pulp dissolving in a kneader (unit 1), monofilament spinning (Unit 2), spin bath (unit 3), stretching and washing (unit 4) and IL recycling with two-stage thin-film evaporators (TFE-1: unit 5; TFE-2: unit 6).

Unlike experiments 4 and 5, recycled IL from previous runs was used to start the new series of 20 cycles. The spinning dopes with a 13 wt % content of a birch prehydrolysis kraft pulp in [mTBDH][OAc] were produced in a vertical kneader (scheme 4, unit 1). The intrinsic viscosity of the pulp was 494 mL/g. Complete dissolution was achieved within 50 min at 80° C. and 15 mbar and a stirring speed of 30 rpm. The hot dope was spun unfiltered into monofilaments. A single-hole nozzle with a diameter of 100 μm with a length-to-width (L/D) ratio of 2:1 was used. The extrusion velocity varied from 1.3 to 1.9 m/min, while the temperature was adjusted between 80 and 87° C. to achieve the optimum rheological properties for dry jet wet spinning. As in the experiments 1 and 2, the viscoelastic properties of all cellulose solutions were measured on an Anton Paar MCR 300 rheometer with a plate and plate geometry (25 mm plate diameter, 1 mm gap size). A dynamic frequency sweep test was used to obtain the complex viscosity (η*) and dynamic moduli (G', G") as a function of angular frequency ω. Here, the dynamic moduli (G'=G") and the angular frequency (ω at COP) at the cross-over point (COP) are the decisive parameters describing the relevant viscoelastic properties of the spinning solution. The results of the rheological properties of the cellulose solutions used for dry jet wet spinning over 20 cycles are summarized in table 11.

TABLE 11

Rheological properties of fresh and recycled dopes prepared from [mTBDH][OAc] and birch PHK pulp at a concentration of 13 wt % at 85° C. The spinning solution from cycle 1 was prepared by recycled IL from previous experiments and had a water content of 3.7%, an H-mTBD content of 1.6% and an A:B ratio of 1.09

| Cycle | Temperature °C. | Complex viscosity $\eta_0^*$ [Pa · s] | Angular frequency $\omega$ at COP [s$^{-1}$] | Complex modulus G' = G" at COP [Pa] |
|---|---|---|---|---|
| 1 | 85 | 30 268 | 0.79 | 4011 |
| 2 | 85 | 31 772 | 0.75 | 4039 |
| 3 | 85 | 39 012 | 0.61 | 4181 |
| 4 | 85 | 36 508 | 0.65 | 4232 |
| 5 | 85 | 35 014 | 0.75 | 4523 |
| 6 | 85 | 26 719 | 0.79 | 3605 |
| 7 | 85 | 22 144 | 1.02 | 3692 |
| 8 | 85 | 29 475 | 0.78 | 3844 |
| 9 | 85 | 25 818 | 1.11 | 5013 |
| 10 | 85 | 25 588 | 0.83 | 3542 |
| 11 | 85 | 34 083 | 0.74 | 4257 |
| 12 | 85 | 54 822 | 0.62 | 5920 |
| 13 | 85 | 38 656 | 0.68 | 4290 |
| 14 | 85 | 25 574 | 0.91 | 3841 |
| 15 | 85 | 34 759 | 0.72 | 3787 |
| 16 | 85 | 23 013 | 1.03 | 3781 |
| 17 | 85 | 23 678 | 0.98 | 3839 |
| 18 | 85 | 23 767 | 1.06 | 4006 |
| 19 | 85 | 23 985 | 0.99 | 3899 |
| 20 | 85 | 30 870 | 0.84 | 4317 |
| Average | 85 | 30 776 | 0.83 | 4131 |
| Stdev | ±0 | ±7 827 | ±0.15 | ±544 |

Except for the sample of cycle 12, the variations in rheological parameters were not greater than in cellulose solutions prepared from fresh IL. Despite the high complex viscosity and the dynamic modulus, the cellulose solution of cycle 12 showed good spinnability (possibly the sample was not measured freshly prepared and already showed a slight gel formation).

As mentioned above, fibre spinning was performed with a customized monofilament laboratory piston spinning unit (Fourné Polymertechnik, Germany). The cylinder was loaded with unfiltered cooled, solidified and shaped [mTBDH][OAc]-pulp solution heated to 85° C. to form an air bubble-free spin dope. A single-hole nozzle with a diameter of 100 μm and a length/width ratio (L/D) of 2:1 was used. The temperature was kept between 80-87° C. to adapt to the optimum rheological properties for dry jet wet spinning.

In addition to spinning in pure water, the spinning behaviour was also investigated in spinning baths enriched with (partly 10 and) 20 wt % IL. The measured fiber properties of the individual spinning tests after maximum draw in spinning baths spun in pure water as well as in 20 wt % IL are given in table 12.

TABLE 12

Mechanical properties of Ioncell ® Fibers spun under conditioned conditions from birch PHK solutions in [mTBDH][OAc] both in pure water and in water containing 10-30 wt. % IL

| Cycle | IL in spin bath wt % | DR max | Properties at DR11 conditioned | | |
|---|---|---|---|---|---|
| | | | Titer dtex | Tenacity cN/tex | Elongation % |
| 1 | 0 | 11 | 1.2 ± 0.3 | 43.2 ± 8.3 | 8.7 ± 1.7 |
|   | 10 | 11 | 1.4 ± 0.2 | 45.7 ± 3.0 | 9.3 ± 0.6 |
| 2 | 0 | 11 | 1.4 ± 0.1 | 48.0 ± 3.4 | 8.8 ± 0.5 |
|   | 10 | 11 | 1.4 ± 0.3 | 40.1 ± 5.8 | 8.4 ± 1.4 |
| 3 | 0 | 12 | 1.5 ± 0.2 | 42.6 ± 8.1 | 9.6 ± 2.2 |
|   | 10 | 11 | 1.5 ± 0.2 | 43.9 ± 7.1 | 9.6 ± 1.6 |
|   | 20 | 12 | 1.4 ± 0.2 | 45.7 ± 6.2 | 9.4 ± 1.1 |
| 4 | 0 | 12 | 1.5 ± 0.2 | 47.3 ± 6.9 | 9.7 ± 1.5 |
|   | 10 | 13 | 1.3 ± 0.2 | 49.0 ± 3.9 | 10.0 ± 1.0 |
|   | 20 | 15 | 1.4 ± 0.1 | 45.0 ± 2.7 | 9.3 ± 1.5 |
| 5 | 0 | 13 | 1.3 ± 0.3 | 36.3 ± 5.6 | 9.2 ± 1.4 |
|   | 10 | 16 | 1.3 ± 0.1 | 49.1 ± 4.0 | 10.0 ± 1.3 |
|   | 20 | 16 | 1.5 ± 0.2 | 47.2 ± 3.4 | 10.0 ± 1.2 |
| 6 | 0 | 11 | n.d. | n.d. | n.d. |
| 7 | 0 | 10 | n.d. | n.d. | n.d. |
| 8 | 0 | 16 | 1.3 ± 0.1 | 49.2 ± 4.4 | 8.8 ± 1.0 |
| 9 | 0 | 12 | 1.2 ± 0.2 | 49.2 ± 6.1 | 8.9 ± 1.2 |
|   | 10 | 12 | 1.3 ± 0.2 | 47.0 ± 3.7 | 9.4 ± 1.7 |
|   | 20 | 12 | 1.3 ± 0.2 | 44.5 ± 3.5 | 8.5 ± 1.2 |
| 10 | 0 | 14 | 1.4 ± 0.2 | 45.9 ± v4.2 | 8.7 ± 1.1 |
|    | 20 | 12 | 1.3 ± 0.2 | 43.7 ± 2.9 | 8.9 ± 1.1 |
| 11 | 0 | 16 | 1.3 ± 0.2 | 49.1 ± 3.9 | 9.7 ± 0.7 |
|    | 20 | 11 | 1.2 ± 0.2 | 46.2 ± 6.0 | 9.7 ± 1.6 |
| 12 | 0 | 11 | 1.7 ± 0.2 | 40.1 ± 5.8 | 7.1 ± 0.9 |
| 13 | 0 | 11 | 1.2 ± 0.3 | 45.7 ± 5.7 | 9.0 ± 1.0 |
|    | 20 | 14.5 | 1.3 ± 0.1 | 40.4 ± 3.5 | 9.3 ± 1.0 |
| 14 | 0 | 11 | 1.3 ± 0.1 | 45.7 ± 4.3 | 8.8 ± 0.8 |
|    | 20 | 16 | 1.4 ± 0.2 | 44.3 ± 3.9 | 9.9 ± 1.1 |
| 15 | 0 | 11 | 1.4 ± 0.2 | 45.3 ± 5.1 | 8.9 ± 1.6 |
|    | 20 | 14 | 1.3 ± 0.1 | 48.2 ± 3.7 | 9.2 ± 0.9 |
| 16 | 0 | 11 | 1.3 ± 0.2 | 43.4 ± 5.1 | 7.5 ± 1.1 |
|    | 20 | 14 | 1.3 ± 0.1 | 45.7 ± 3.9 | 6.7 ± 1.0 |
| 17 | 0 | 11 | 1.2 ± 0.1 | 46.8 ± 3.0 | 7.8 ± 1.4 |
|    | 20 | 15 | 1.2 ± 0.1 | 47.0 ± 3.6 | 8.5 ± 0.9 |

TABLE 12-continued

Mechanical properties of Ioncell ® Fibers spun under
conditioned conditions from birch PHK solutions in [mTBDH][OAc]
both in pure water and in water containing 10-30 wt. % IL

| Cycle | IL in spin bath wt % | DR max | Properties at DR11 conditioned | | |
|---|---|---|---|---|---|
| | | | Titer dtex | Tenacity cN/tex | Elongation % |
| 18 | 0 | 11 | 1.2 ± 0.1 | 43.6 ± 5.9 | 7.4 ± 1.3 |
| | 20 | 15 | 1.3 ± 0.1 | 41.5 ± 5.4 | 7.3 ± 1.4 |
| 19 | 0 | 11 | 1.3 ± 0.2 | 41.4 ± 6.9 | 8.0 ± 1.4 |
| | 20 | 15 | 1.3 ± 0.1 | 45.4 ± 4.1 | 8.0 ± 1.1 |
| 20 | 0 | 11 | 1.3 ± 0.1 | 44.1 ± 3.6 | 8.5 ± 0.8 |
| | 20 | 14 | 1.3 ± 0.1 | 45.2 ± 3.6 | 7.9 ± 0.9 |

The quality of the spinning behaviour was determined on the basis of the highest possible draw ratio at a spinning time of more than 300 (cycle 1-11) or 500 (cycle 12-20) seconds. For reasons of time, the draw ratios (DR) were not (always) increased by only one, but mostly in steps of 3 units, i.e. from DR 11 to 14. For this reason, it is possible that the maximum DR is only given as 11, because the spinning time at a DR of 15 was only possible for about 200 seconds (lower draw ratio, about 13 or 14 were not tested due to time reasons). Based on empirical data, the spinning behaviour was classified as follows:

Not spinnable <3 DR; 3≤poor <6; 6≤medium <8; 8≤good <12; 12≤very good <15; higher than 15 constitutes excellent spinnability.

According to the results shown in Table 12, the spinning behaviour of all spinning tests, Cycle 1-Cycle 20, can be rated as good to very good and in some cases even excellent. The fiber data, all measured on fibers after a draw ratio of 11, clearly show that the fiber properties correspond to the best available Lyocell fibers. In addition, no change in the fiber data was observed over the entire 20 cycles. The mechanical fiber properties remain stable at a high level, taking into account the usual variations. Surprisingly, higher DRs with high spinning stability were achieved when spinning into a spin bath with 10-20 wt % IL compared to cases where pure water was used as spin bath. The reason for the high spinning reliability at high DRs during the entire 20 cycles is the almost unchanged composition of the ionic liquid components as shown in Example 7 and Table 13.

Example 7

The combined spin bath and the distillates from the previous run were filtered and, due to the small volume and the high initial IL concentration, directly fed to the Thin Film Evaporator TFE-1 for evaporation (FIG. 14). With exception of the fiber washing filtrate, all IL-containing streams were combined and recovered.

TABLE 13

Evaporation of the combined IL-containing streams by means of a two-stage thin film evaporation
(TFE-1: 60-62° C., 20 mbar, TFE-2: 80-82° C., 17 mbar). Characterization of the
composition of the residues of TFE-1 + 2 and the distillate from TFE-2.

| Cycles$_N$ | FeedIL wt % | TFE-1, residue | | | TFE-2, residue | | | TFE-2, distillate | | | | Total Hydrolysis per cycle wt % of feed |
|---|---|---|---|---|---|---|---|---|---|---|---|---|
| | | A/B* mole/mole | ΣH-mTBD wt % | H$_2$O wt % | A/B* mole/mole | ΣH-mTBD wt % | H$_2$O wt % | mTBD | | ΣH-mTBD | | |
| | | | | | | | | wt % in distillate | wt % of feed IL | wt % in distillate | wt % of feed IL | |
| C$_0$* | 14 | 1.01 | 0.2 | 15.3 | 1.08 | 0.2 | 2.7 | 0.5 | 0.1 | 15.0 | 1.6 | 1.8 |
| C1 | 20 | 1.04 | 2.2 | 10.0 | 1.09 | 1.5 | 3.5 | 1.3 | 0.2 | 0.8 | 0.2 | 1.3 |
| C2 | 20 | 1.07 | 1.9 | 17.5 | 1.09 | 2.7 | 3.6 | 1.2 | 0.2 | 1.5 | 0.3 | 2.1 |
| C3 | 20 | 1.07 | 2.2 | 13.0 | 1.15 | 2.3 | 3.4 | 1.8 | 0.3 | 0.8 | 0.1 | 1.8 |
| C4 | 20 | 1.06 | 2.5 | 14.1 | 1.16 | 0.7 | 3.6 | 0.9 | 0.2 | 2.5 | 0.5 | 1.0 |
| C5 | 40 | 1.06 | 1.3 | 10.9 | 1.06 | 1.8 | 3.5 | 0.6 | 0.1 | 1.9 | 0.2 | 1.6 |
| C6 | 20 | 1.07 | 2.0 | 13.9 | 1.07 | 2.1 | 3.7 | 0.4 | 0.0 | 2.2 | 0.3 | 1.8 |
| C7 | 20 | 1.06 | 1.5 | 14.2 | 1.08 | 1.6 | 3.7 | 0.6 | 0.1 | 2.5 | 0.5 | 1.6 |
| C8 | 20 | | | 15.9 | 1.09 | 0.4 | 3.5 | 2.0 | 0.3 | 0.3 | 0.0 | 0.3 |
| C9 | 20 | | | 14.4 | 1.09 | 1.9 | 3.9 | 1.0 | 0.2 | 1.7 | 0.4 | 1.6 |
| C10 | 20 | | | 13.8 | 1.08 | 1.6 | 3.7 | 1.1 | 0.2 | 1.8 | 0.3 | 1.4 |
| C11 | 20 | | | 15.4 | 1.08 | 2.0 | 4.6 | 0.6 | 0.1 | 0.6 | 0.1 | 1.4 |
| C12 | 20 | | | 12.9 | 1.08 | 0.7 | 4.4 | 1.2 | 0.2 | 2.0 | 0.3 | 0.8 |
| C13 | 20 | 1.04 | 0.7 | 13.4 | 1.09 | 0.7 | 3.9 | 0.7 | 0.1 | 1.9 | 0.3 | 0.8 |
| C14 | 20 | 1.06 | 0.7 | 13.3 | 1.08 | 1.3 | 4.0 | 0.5 | 0.1 | 1.8 | 0.3 | 1.2 |
| C15 | 20 | 1.04 | 1.2 | 15.3 | 1.09 | 1.3 | 3.6 | 0.8 | 0.1 | 0.9 | 0.1 | 0.9 |
| C16 | 20 | 1.05 | 1.8 | 15.0 | 1.09 | 0.6 | 3.8 | 0.5 | 0.1 | 1.7 | 0.3 | 0.7 |
| C17 | 20 | 1.04 | 2.1 | 17.1 | 1.11 | 0.5 | 3.9 | 0.8 | 0.1 | 1.4 | 0.2 | 0.5 |
| C18 | 20 | 1.10 | 0.3 | 16.2 | 1.08 | 0.6 | 3.7 | 0.5 | 0.1 | 1.8 | 0.3 | 0.7 |
| C19 | 20 | 1.05 | 1.5 | 14.4 | 1.11 | 0.4 | 4.2 | 0.6 | 0.1 | 1.5 | 0.3 | 0.7 |
| C20 | 20 | 1.10 | 1.1 | 14.6 | 1.13 | 0.4 | 3.8 | 0.6 | 0.1 | 1.5 | 0.2 | 0.5 |
| AV | 21 | 1.06 | 1.5 | 14.3 | 1.09 | 1.3 | 3.8 | 0.9 | 0.1 | 1.6 | 0.3 | 1.1 |
| Stdev | 4.5 | 0.02 | 0.05 | 1.8 | 0.03 | 0.7 | 0.3 | 0.4 | 0.1 | 0.6 | 0.1 | 0.5 |

*= AcOH/mTBD ratio

After the first stage of evaporation, TFE-1, the average water content of the IL residue was about 14%, which is close to the highest hydrolysis rate of mTBD (FIG. 10). Due to the short residence time in TFE-1, the amount of hydrolysis products produced remained at a low, safe level of only 1.5% on average after 20 cycles. The acid to base ratio increases only insignificantly to an average value of 1.06: 1.00.

After the second evaporation stage to adjust a residual water content of 3-4%, the concentration of the hydrolysis products, only H-mTBD-1, even decreases slightly on average, probably due to the slightly increased acid-base ratio.

It is quite surprising and unexpected that during the twenty recovery cycles neither the concentration nor the absolute amount of hydrolysis products in the IL increases, but levels off at a relatively low level. In none of the samples were even traces of acetamides detected, indicating that the conditions applied during the 20 evaporation steps are relatively mild.

Due to the high mTBD excess in the distillate of TFE-2, most of the superbase is converted into the hydrolysis product H-mTBD. Compared to the total amount of the ionic liquid, the amount of hydrolysis products from the distillate is small and does not increase the total amount of hydrolysis products after reintroduction into the spinning bath.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

Further embodiments are disclosed in the following numbered clauses:

1. A process for the production of a cellulose fibre or film comprising the dissolution of a cellulose substrate in an ionic liquid consisting of the superbase cation 7-methyl-1,5,7-triazabicyclo[4.4.0]dec-5-enium [mTBDH]$^+$ and an anion selected from acids in which the acids have a stoichiometric excess to produce a spinning dope. The cation may contain the synthesis precursor 1,5,7-triazabicyclo [4.4.0]dec-5-enium [TBDH]+. The spinning dope is extruded through a spinneret to form filaments or films from the solution.
2. The process according to clause 1, wherein the anion is a carboxylate, preferably acetate, formate or propionate.
3. The process according to clause 1, wherein the stoichiometric excess of the acid is 0 to 30 mole %, preferably 10 to 20 mole %.
4. The process according to clause 1, wherein the stoichiometric excess of acetic acid is 0 to 30 mole %, preferably 10 to 20 mole %.
5. The process according to clause 1, wherein the cellulose substrate is a paper pulp, a dissolving pulp, recycled cellulosic textile waste, recycled wastepaper, most suitably a bleached dissolving pulp.
6. The process according to clause 1, wherein the superbase mTBD may contain TBD in an amount of 0 to 30 wt %, preferably 0 to 10 wt %.
7. The process according to clause 1, wherein the tolerable amount of hydrolysis products, 1-[3-(methylammonium) propyl]-1,3-diazinan-2-one acetate ([H-mTBDH-1][OAc]), 1-(3-ammoniopropyl)-3-methyl-1,3-diazinan-2-one acetate ([H-mTBDH-2][OAc]), is <20 wt %, preferably <10 wt %, suitably <5 wt %.
8. The process according to clause 1, wherein the ionic liquid [mTBDH][OAc] is recycled by removing water to a tolerable level in infinite steps.
9. The process according to clause 1, wherein the water is removed by multiple-effect evaporation plants comprising falling film, thin film and vapor recompression evaporators.
10. The process according to clause 1, wherein the tolerable amount of residual water comprises <7.5 wt %, preferably 3-5 wt %, most suitably <3 wt %.
11. The process according to clause 1, wherein the solvent is completely stable in a concentration of 40 wt % or lower as occurring in the coagulation bath and washing operation. This has an impact on the recycling of the distillates from the evaporation processes.
12. The process according to clause 1 for producing a cellulose fiber having a dry tenacity >35 cN/tex, a wet-to-dry tenacity of >0.80 and a modulus of toughness of >50 MPa, preferably a dry tenacity ≥40 cN/tex, a wet-to-dry tenacity of >0.85 and a modulus of toughness of ≥60 MPa.
13. The process according to clause 1 for producing textile fibres.
14. The process according to clause 1 for producing technical fibres.
15. The process according to clause 1 for producing a film.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in the generation of man-made cellulosic fibres from various cellulosic substrates including paper pulp, dissolving pulp, recycled cellulosic textile waste, recycled wastepaper, and bleached dissolving pulp. The process can be used to produce textile fibres for use in clothing, soft furnishings, curtains and upholstery as well as the production of technical fibres and the production of films.

ACRONYMS LIST

DSC=Differential scanning calorimetry
TGA=Thermogravimetric analysis
MMCF=man-made cellulose fibres
KT=Kamlet-Taft
AB ratio=acid-to-base ratio
[APPH][OAc]=1-(3-aminopropyl)-2-pyrrolidonium acetate
COP=croos over point
[emim][OAc]=1-ethyl-3-methylimidazolium acetate
[DBNH][OAc]=1,5-diaza-bicyclo[4.3.0]non-5-enium acetate
[DBUH][OAc]=1,8-diazabicyclo(5.4.0)undec-7-enium acetate
[H-mTBD-1][OAc]=1-[3-(methylammonio)propyl]-1,3-diazinan-2-onemium acetate
[H-mTBD-2][OAc]=1-(3-ammoniopropyl)-3-methyl-1,3-diazinan-2-onemium acetate
[mTBDH][OAc]=7-methyl-1,5,7-triazabicyclo[4.4.0]dec-5-enium acetate
[TBDH][OAc]=1,5,7-Triazabicyclo[4.4.0]dec-5-enium acetate
DBN=1,5-diaza-bicyclo[4.3.0]non-5-ene
DBU=1,8-diazabicyclo(5.4.0)undec-7-enene
DMC=dimethyl carbonate
DR=draw ratio
IL=ionic liquid
PIL=protic ionic liquid
BAIL=Brönsted acid ionic liquid
L/D length-to-width
MMCF=man-made cellulosic fibers
mTBD=7-methyl-1,5,7-triazabicyclo[4.4.0]dec-5-ene
NMMO=N-methylmorpholine N-oxide monohydrate
TBD=1,5,7-Triazabicyclo[4.4.0]dec-5-ene
TFE-1=first stage thin-film evaporator
TFE-2=second stage thin-film evaporator
α=acidity
β=basicity
β−α=net basicity
Δn=birefringence
$\eta_0^*$=complex viscosity
$\pi^*$=solvent polarizability
ω=angular frequency
ωcop=angular frequency at the cross over point

| REFERENCE SIGNS LIST | |
|---|---|
| kneader unit | 1 |
| filter | 2 |
| spinning unit | 3 |
| spin bath | 4 |
| washing and stretching unit | 5 |
| preconcentration unit | 6 |
| first thin film evaporation stage | 7 |
| second thin film evaporation stage | 8 |

| REFERENCE SIGNS LIST | |
|---|---|
| kneader unit | 11 |
| filtering unit | 12 |
| spinning unit | 13 |
| spin bath | 14 |
| washing and stretching unit | 15 |
| first thin film evaporation stage | 17 |
| second thin film evaporation stage | 18 |

CITATION LIST

1. SIXTA, H., et al., A process for making a cellulose fiber or film, WO/2018/138416, Editor. 2018.
2. Swatloski, R. P., et al., Dissolution of cellulose with ionic liquids. Journal of the American Chemical Society, 2002. 124(18): p. 4974-4975.
3. Bentivoglio, G., et al., Cellulose processing with chloride-based ionic liquids. Lenzinger Ber., 2006. 86(Copyright (C) 2017 American Chemical Society (ACS). All Rights Reserved.): p. 154-161.
4. Laus, G., et al., Ionic liquids: current developments, potential and drawbacks for industrial applications. Lenzinger Ber., 2005. 84(Copyright (C) 2017 American Chemical Society (ACS). All Rights Reserved.): p. 71-85.
5. Ebner, G., et al., Side reaction of cellulose with common 1-alkyl-3-methylimidazolium-based ionic liquids. Tetrahedron Lett., 2008. 49(Copyright (C) 2017 American Chemical Society (ACS). All Rights Reserved.): p. 7322-7324.
6. Cai, T., et al., Structure and properties of cellulose fibers from ionic liquids. J. Appl. Polym. Sci., 2010. 115(2): p. 1047-1053.
7. Hauru, L. K. J., et al., Cellulose regeneration and spinnability from ionic liquids. Soft Matter, 2016. 12(Copyright (C) 2017 American Chemical Society (ACS). All Rights Reserved.): p. 1487-1495.
8. Hummel, M., et al., Ionic liquids for the production of man-made cellulosic fibers: opportunities and challenges. Adv. Polym. Sci., 2016. 271(Cellulose Chemistry and Properties: Fibers, Nanocelluloses and Advanced Materials): p. 133-168.
9. Elsayed, S., M. Hummel, and H. Sixta, Comparative evaluation of the dry-jet wet spinning behaviour of three superbase-based ionic liquids in comparison to NMMO. unpublished, 2020.
10. Amarasekara, A. S., Acidic Ionic Liquids. Chem. Rev. (Washington, DC, U. S.), 2016. 116(Copyright (C) 2016 American Chemical Society (ACS). All Rights Reserved.): p. 6133-6183.
11. Angell, C. A., N. Byrne, and J.-P. Belieres, Parallel Developments in Aprotic and Protic Ionic Liquids: Physical Chemistry and Applications. Accounts of Chemical Research, 2007. 40(11): p. 1228-1236.
12. Hyde, A. M., et al., Investigating the Underappreciated Hydrolytic Instability of 1,8-Diazabicyclo[5.4.0]undec-7-ene and Related Unsaturated Nitrogenous Bases. Org. Process Res. Dev., 2019. 23(9): p. 1860-1871.
13. Earle, M. J., et al., The distillation and volatility of ionic liquids. Nature (London, U. K.), 2006. 439(7078): p. 831-834.
14. Hauru, L. K. J., et al., Role of Solvent Parameters in the Regeneration of Cellulose from Ionic Liquid Solutions. Biomacromolecules, 2012. 13(9): p. 2896-2905.

15. King, A. W. T., et al., Relative and inherent reactivities of imidazolium-based ionic liquids: the implications for lignocellulose processing applications. RSC Adv., 2012. 2(Copyright (C) 2016 American Chemical Society (ACS). All Rights Reserved.): p. 8020-8026.
16. Guizani, C., et al., Air gap spinning of a cellulose solution in an ionic liquid with a novel vertically arranged spinning bath to simulate a closed loop operation Cellulose submitted, 2020.
17. Zhou, J., et al., Recovery and purification of ionic liquids from solutions: a review. RSC Adv., 2018. 8(57): p. 32832-32864.
18. Krassig, H., et al., Cellulose, in Ullmann's Encyclopedia of Industrial Chemistry. 2004.
19. Michud, A., Development of a novel process for the production of man-made cellulosic fibers from ionic liquid solution, in Department of Forest Products Technology. 2016, Dissertation, Aalto University: Espoo. p. 71.
20. Lewis, C. A. and R. Wolfenden, The Nonenzymatic Decomposition of Guanidines and Amidines. J. Am. Chem. Soc., 2014. 136(1): p. 130-136.
21. Carafa, M., E. Mesto, and E. Quaranta, DBU-Promoted Nucleophilic Activation of Carbonic Acid Diesters. European Journal of Organic Chemistry, 2011. 2011(13): p. 2458-2465.
22. Mayr, H., et al., Scales of Lewis Basicities toward C-Centered Lewis Acids (Carbocation). Journal of the American Chemical Society, 2015. 137(7): p. 2580-2599.
23. Wolfe, R. H. d., Kinetics and mechanisms of reactions of amidines, in Amidines and Imidates (1975), S. Patai, Editor. 1975, John Wiley & Sons. p. 349-384.
24. Heidelberger, C., et al., Amidine als Zwischenprodukte bei Umamidierungsreaktionen. 9. Mitteilung uber Umamidierungsreaktionen. Helvetica Chimica Acta, 1981. 64(2): p. 399-406.
25. Oediger, H., et al., 1.5-Diaza-bicyclo[4.3.0]nonen-(5). Ein neues Reagenz zur Einfuhrung von Doppelbindungen. Chemische Berichte, 1966. 99(6): p. 2012-2016.
26. Ostonen, A., Thermodynamic study of protic ionic liquids, in Department of Biotechnology and Chemical Technology. 2017, Aalto University: Espoo.
27. Ribeiro, F. M. S., et al., Experimental Evidence for Azeotrope Formation from Protic Ionic Liquids. ChemPhysChem, 2018: p. Ahead of Print.
28. Baird, Z. S., et al., Vapor-liquid equilibrium of the ionic liquid 7-methyl-1,5,7-triazabicyclo[4.4.0]dec-5-enium acetate and its mixtures with water. Journal of Chemical & Engineering Data, 2020. accepted. Volume 65, Issue 5, 2405-2421
29. Benjamin, V., Effect of some Ioncell-F process parameters on the cellulose dissolution and dope spinnability, in Bioproducts and Biosystems. 2019, Aalto University: Espoo, Finland.
30. Michud, A., M. Hummel, and H. Sixta, Influence of molar mass distribution on the final properties of fibers regenerated from cellulose dissolved in ionic liquid by dry-jet wet spinning. Polymer, 2015. 75: p. 1-9.

The invention claimed is:

1. A process for the production of cellulose fibers, filaments, or a film, the process comprising:
    preparing an ionic liquid by combining acetic acid as a source of acetate anion and 7-methyl-1,5,7-triazabicyclo [4.4.0]dec-5-enium ([mTBDH]+) as a superbase cation in a 10 to 20 mole % stoichiometric excess of the acetic acid to the [mTBDH]+ in the ionic liquid, wherein the prepared ionic liquid consists of [mTBDH]+ and acetate;
    dissolving a cellulose substrate in the ionic liquid to produce a spinning dope;
    extruding the spinning dope through a spinneret in a coagulation bath containing water to form the cellulose fibers, filaments or a film from the spinning dope;
    withdrawing the ionic liquid in an aqueous mixture with water from the coagulation bath;
    recovering the ionic liquid from the aqueous mixture by removing the water; and
    optionally recycling the recovered ionic liquid to the dissolving step.

2. The process according to claim 1, further comprising washing the cellulose fibers, filaments a film obtained from the coagulation bath with water and withdrawing further ionic liquid in an aqueous mixture with water from said washing step.

3. The process according to claim 2, comprising washing the cellulose fibers, filaments, or a film in the washing step with water at an ionic liquid concentration of 40 wt % or less.

4. The process according to claim 2, wherein the aqueous mixture withdrawn from the coagulation bath or from the washing step contains 40 wt % or less of ionic liquid.

5. The process according to claim 1, wherein the cellulose substrate comprises one or more of a paper pulp, a dissolving pulp, recycled cellulosic textile waste, recycled wastepaper, or a bleached dissolving pulp.

6. The process according to claim 1, wherein the spinning dope comprises 1,5,7-triazabicyclo [4.4.0]dec-5-ene (TBD) as an impurity in an amount up to 30 wt %.

7. The process according to claim 6, wherein the spinning dope comprises 1,5,7-triazabicyclo [4.4.0]dec-5-ene (TBD) as an impurity in an amount of from 10 to 30 wt %.

8. The process according to claim 1, wherein the spinning dope comprises water as an impurity in an amount of up to 7.5 wt %.

9. The process according to claim 1, wherein the recovered ionic liquid comprises one or more hydrolysis products selected from the group consisting of 1-[3-(methylammonium) propyl]-1,3-diazinan-2-one acetate ([H-mTBDH-1] [OAc]) and 1-(3-ammoniopropyl)-3-methyl-1,3-diazinan-2-one acetate ([H-mTBDH-2] [OAc]), wherein the hydrolysis products are present in an amount of ≤20 wt %, calculated from the weight of the recovered ionic liquid.

10. The process according to claim 1, wherein the ionic liquid is recycled by removing water from the aqueous mixture of the ionic liquid in a series of water-removal steps.

11. The process according to claim 1, wherein water is removed from the aqueous mixture by one or more evaporators selected from the group consisting of falling film evaporators, thin film evaporators, vapor recompression evaporators, and combinations thereof.

12. The process according to claim 11, wherein water is removed from the aqueous mixture in one or more evaporation plants comprising two or more evaporators selected from the group consisting of falling film evaporators, thin film evaporators, vapor recompression evaporators, and combinations thereof.

13. The process according to claim 1, wherein the amount of water present in the recovered ionic liquid is ≤7.5 wt %, calculated from the total weight of the recovered ionic liquid and the water.

14. The process according to claim 1, wherein the coagulation bath comprises the ionic liquid in a concentration of 40 wt % or less.

15. The process according to claim 1, comprising producing a cellulose fiber having a dry tenacity ≥35 cN/tex, a wet-to-dry tenacity of >0.80, and a modulus of toughness of ≥50 MPa.

16. The process according to claim 1, wherein the extruding step produces textile fibers.

* * * * *